United States Patent
Chen et al.

(10) Patent No.: US 11,496,272 B2
(45) Date of Patent: Nov. 8, 2022

(54) METHODS FOR UPLINK FEEDBACK INFORMATION TRANSMISSION, TERMINAL DEVICE, AND NETWORK DEVICE

(71) Applicant: GUANGDONG OPPO MOBILE TELECOMMUNICATIONS CORP., LTD., Guangdong (CN)

(72) Inventors: Wenhong Chen, Guangdong (CN); Zhihua Shi, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 17/396,747

(22) Filed: Aug. 8, 2021

(65) Prior Publication Data

US 2021/0367740 A1   Nov. 25, 2021

Related U.S. Application Data

(63) Continuation of application No. PCT/CN2019/075971, filed on Feb. 22, 2019.

(51) Int. Cl.
*H04J 3/00* (2006.01)
*H04L 5/00* (2006.01)

(52) U.S. Cl.
CPC ................. *H04L 5/0055* (2013.01)

(58) Field of Classification Search
CPC ..... H04L 1/189; H04L 5/0055; H04L 1/1825; H04L 1/1614
USPC .......................................................... 370/336
See application file for complete search history.

(56) References Cited

U.S. PATENT DOCUMENTS

| | | | |
|---|---|---|---|
| 2017/0188352 A1 | 6/2017 | Lee et al. | |
| 2017/0366305 A1* | 12/2017 | Hwang | .................. H04L 5/001 |
| 2018/0070341 A1* | 3/2018 | Islam | .................... H04L 1/1887 |
| 2019/0052414 A1 | 2/2019 | Babaei et al. | |

(Continued)

FOREIGN PATENT DOCUMENTS

| | | |
|---|---|---|
| CN | 102013961 A | 4/2011 |
| CN | 102664715 A | 9/2012 |
| CN | 103283170 A | 9/2013 |

(Continued)

OTHER PUBLICATIONS

International search report with English Translation PCT/CN2019/075971 dated Nov. 15, 2019.

(Continued)

*Primary Examiner* — Mang Hang Yeung
(74) *Attorney, Agent, or Firm* — Young Basile Hanlon & MacFarlane, P.C.

(57) ABSTRACT

Methods for uplink feedback information transmission, a terminal device, and a network device. A method includes the following. A terminal device receives first downlink data and second downlink data, where a first ACK/NACK resource corresponding to first ACK/NACK information of the first downlink data and a second ACK/NACK resource corresponding to second ACK/NACK information of the second downlink data occupy the same time-domain resource. The terminal device transmits the first ACK/NACK information and/or the second ACK/NACK information on the time-domain resource.

18 Claims, 8 Drawing Sheets

(56) References Cited

U.S. PATENT DOCUMENTS

2019/0181986 A1* 6/2019 Kitamura .............. H04L 1/1819
2020/0067678 A1 2/2020 Zhou et al.

FOREIGN PATENT DOCUMENTS

| CN | 106797283 A | 5/2017 |
| CN | 109314607 A | 2/2019 |
| EP | 2501072 A1 | 9/2012 |
| WO | 2018086071 A1 | 5/2018 |

OTHER PUBLICATIONS

3GPP TSG RAN WG1 Meeting #96 R1-1902701; Athens, Greece, Feb. 25-Mar. 1, 2019.
3GPP TSG RAN WG1 Meeting #96 R1-1901567; Athens, Greece, Feb. 25-Mar. 1, 2019.
Chinese Office Action with English Translation for CN Application 202110547401.9 dated Mar. 24, 2022. (35 pages).
Extended European Search Report for EP Application 19915888.2 dated Jan. 28, 2022. (14 pages).
3GPP TSG RAN WG1 Meeting NR#3 Nagoya, Japan, R1-1716165, AT&T, Remaining details on supporting multi-TRP transmission and reception, Sep. 18-21, 2017, 4 pages.
3GPP TSG-RAN WGI Meeting #96 RI-1903043, Qualcomm Incorporated, Multi-TRP Enhancements, Feb. 25-Mar. 1, 2019, 30 pages.
Chinese Second Office Action with English Translation for CN Application 202110547401.9, dated Jun. 24, 2022. (29 pages).

* cited by examiner

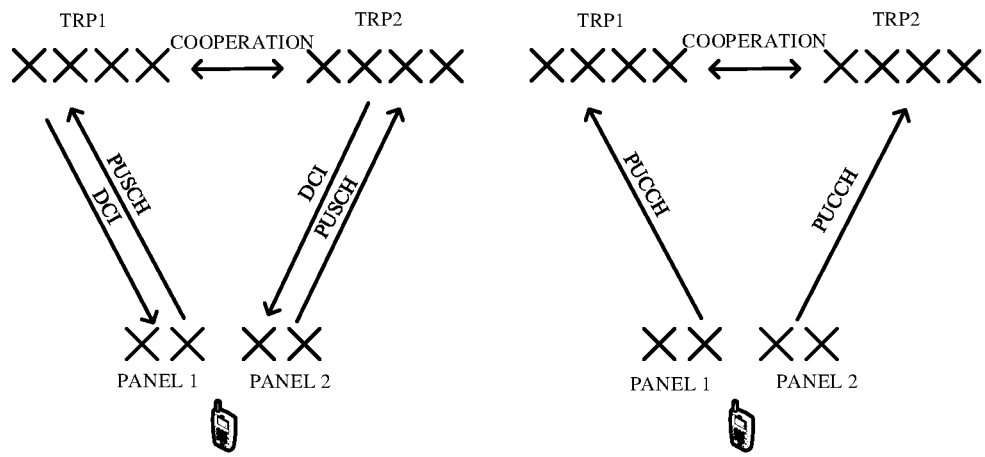

A TERMINAL DEVICE RECEIVES FIRST DOWNLINK DATA AND SECOND DOWNLINK DATA, WHERE A FIRST ACK/NACK RESOURCE CORRESPONDING TO FIRST ACK/NACK INFORMATION OF THE FIRST DOWNLINK DATA AND A SECOND ACK/NACK RESOURCE CORRESPONDING TO SECOND ACK/NACK INFORMATION OF THE SECOND DOWNLINK DATA OCCUPY THE SAME TIME-DOMAIN RESOURCE ~ S410

THE TERMINAL DEVICE TRANSMITS THE FIRST ACK/NACK INFORMATION AND/OR THE SECOND ACK/NACK INFORMATION ON THE TIME-DOMAIN RESOURCE ~ S420

FIG. 6

METHODS FOR UPLINK FEEDBACK INFORMATION TRANSMISSION, TERMINAL DEVICE, AND NETWORK DEVICE

CROSS-REFERENCE TO RELATED APPLICATION(S)

This application is a continuation of International Application No. PCT/CN2019/075971, filed on Feb. 22, 2019, the disclosure of which is hereby incorporated by reference in its entirety.

TECHNICAL FIELD

This disclosure relates to the field of communication, and more particularly to methods for uplink feedback information transmission, a terminal device, and a network device.

BACKGROUND

In the related art, acknowledgment (ACK)/negative acknowledgement (NACK) feedback resources corresponding to physical downlink shared channels (PDSCH) scheduled by different transmission/reception points (TRP) may be allocated to the same time-domain resource, for example, the same ACK/NACK feedback resource, or different ACK/NACK feedback resources on the same time-domain resource.

If a backhaul between TRPs is ideal, the terminal device can multiplex multiple pieces of ACK/NACK information and transmit the multiplexed information to the same TRP on one ACK/NACK feedback resource, and TRPs can quickly exchange ACK/NACK information. If the backhaul between TRPs is non-ideal, the terminal device cannot multiplex the multiple pieces of ACK/NACK information, and instead, the terminal device can only report one of the multiple pieces of ACK/NACK information. Since the terminal device has no idea of a backhaul condition of a network side, the terminal device does not know how to report multiple pieces of ACK/NACK information on the same time-domain resource.

SUMMARY

In a first aspect, a method for uplink feedback information transmission is provided. The method includes the following. A terminal device receives first downlink data and second downlink data, where a first ACK/NACK resource corresponding to first ACK/NACK information of the first downlink data and a second ACK/NACK resource corresponding to second ACK/NACK information of the second downlink data occupy the same time-domain resource. The terminal device transmits the first ACK/NACK information and/or the second ACK/NACK information on the time-domain resource.

In a second aspect, a terminal device is provided. The terminal device is configured to perform the method described in the first aspect or in any other implementation of the first aspect. The terminal device includes functional modules for performing the method described in the first aspect or in any other implementation of the first aspect.

In a third aspect, a network device is provided. The network device includes a memory configured to store computer programs and a processor. The processor is configured to invoke and execute the computer programs stored in the memory, to perform: transmitting first downlink data to a terminal device, wherein the first downlink data corresponds to first ACK/NACK information; determining according to a backhaul connection delay, whether multiplex transmission of the first ACK/NACK information and second ACK/NACK information is supported, wherein the second ACK/NACK information corresponds to second downlink data transmitted by a second network device, and the first ACK/NACK information and the second ACK/NACK information occupy the same time-domain resource; transmitting multiplex indication information to the terminal device, wherein the multiplex indication information is used for the terminal device to determine whether multiplex transmission of the first ACK/NACK information and the second ACK/NACK information is supported.

BRIEF DESCRIPTION OF DRAWINGS

FIG. 5 is a schematic diagram illustrating multiple panels of a terminal device according to implementations.

FIG. 6 is a schematic flowchart of a method for uplink feedback information transmission according to implementations.

DETAILED DESCRIPTION

The following will describe technical solutions of implementations with reference to the accompanying drawings. Apparently, implementations described herein are merely some implementations, rather than all implementations, of the disclosure. Based on the implementations described herein, all other implementations obtained by those of ordinary skill in the art without creative effort shall fall within the protection scope of the disclosure.

The technical solutions of implementations are applicable to various communication systems, for example, a global system of mobile communication (GSM), a code division multiple access (CDMA) system, a wideband code division multiple access (WCDMA) system, a general packet radio service (GPRS) system, a long term evolution (LTE) system, an LTE frequency division duplex (LTE-FDD) system, an LTE time division duplex (LTE-TDD) system, a universal mobile telecommunication system (UMTS), a worldwide interoperability for microwave access (WiMAX) communication system, or a $5^{th}$ generation (5G) system.

Figure 1:
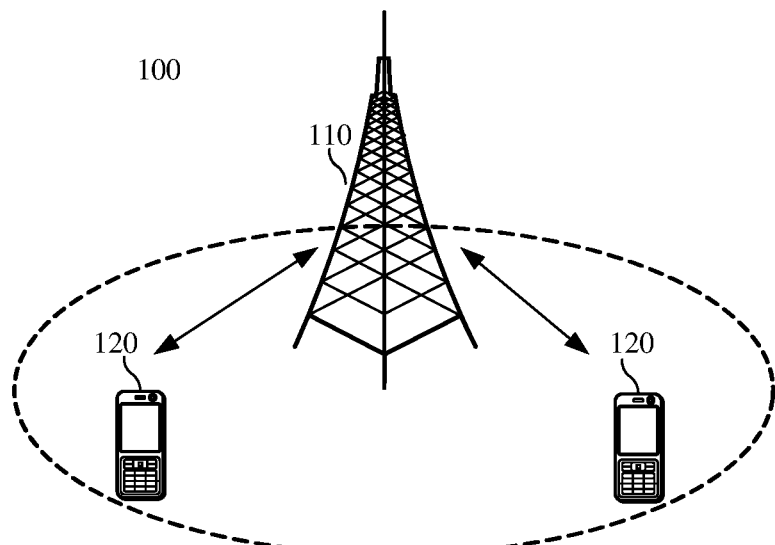
FIG. 1 is a schematic architectural diagram of a communication system according to implementations.

FIG. 1 illustrates a communication system 100 of implementations. The communication system 100 may include a network device 110. The network device 110 may be a device that communicates with a terminal device 120 (also referred to as a communication terminal or a terminal). The network device 110 can provide a communication coverage for a specific geographical area and communicate with terminal devices in the coverage area. The network device 110 may be a base transceiver station (BTS) in the GSM or in the CDMA system, or may be a NodeB (NB) in the WCDMA system, or may be an evolutional Node B (eNB or eNodeB) in the LTE system, or may be a gNB in the 5G system, or a radio controller in a cloud radio access network (CRAN). Alternatively, the network device may be a mobile switching center, a relay station, an access point, an in-vehicle device, a wearable device, a hub, a switch, a bridge, a router, a network-side device in a 5G network, or a network device in a future evolved public land mobile network (PLMN).

The communication system 100 further includes at least one terminal device 120 in a coverage area of the network device 110. The "terminal device" referred to herein can include but is not limited to a device configured to communicate via a wired line, another data connection/network, a wireless interface, a device which is part of another terminal device and configured to receive/transmit communication signals, and/or an Internet of things (IoT) device. Examples of the wired line may include, but are not limited to, a public switched telephone network (PSTN), a digital subscriber line (DSL), a digital cable, and a direct connection cable. Examples of the wireless interface may include, but are not limited to, a wireless interface for a cellular network, a wireless local area network (WLAN), a digital television network (such as a digital video broadcasting-handheld (DVB-H) network), a satellite network, and an amplitude modulation-frequency modulation (AM-FM) broadcast transmitter. A terminal device configured to communicate via a wireless interface may be called a "wireless communication terminal", a "wireless terminal", or a "mobile terminal". Examples of a mobile terminal may include, but are not limited to, a satellite telephone or cellular telephone, a personal communication system (PCS) terminal integrated with functions of cellular radio telephone, data processing, fax, and/or data communication, a personal digital assistant (PDA) equipped with radio telephone, pager, Internet/Intranet access, web browsing, notebook, calendar, and/or global positioning system (GPS) receiver, and/or a conventional laptop, a handheld receiver, or other electronic devices equipped with radio telephone receiver. The terminal device may refer to an access terminal, a user equipment (UE), a subscriber unit, a subscriber station, a mobile station, a remote station, a remote terminal, a mobile device, a user terminal, a terminal, a wireless communication device, a user agent, or a user device. The access terminal may be a cellular radio telephone, a cordless telephone, a session initiation protocol (SIP) telephone, a wireless local loop (WLL) station, a PDA, a handheld device with wireless communication functions, a computing device, other processing devices coupled with a wireless modem, an in-vehicle device, a wearable device, a terminal device in the 5G network, a terminal device in the future evolved PLMN, etc.

As an example, terminal devices 120 can communicate with each other through device to device (D2D) communication.

As an example, the 5G system or 5G network can also be referred to as a new radio (NR) system or NR network.

FIG. 1 exemplarily illustrates one network device and two terminal devices. The communication system 100 may also include multiple network devices, and there can be other numbers of terminal devices in a coverage area of each of the network devices, which is not limited herein.

The communication system 100 may further include other network entities such as a network controller, a mobile management entity, or the like, and the disclosure is not limited in this regard.

According to implementations, a device with communication functions in a network/system can be referred to as a "communication device". Taking the communication system 100 illustrated in FIG. 1 as an example, the communication device may include the network device 110 and the terminal device(s) 120 that have communication functions. The network device 110 and the terminal device(s) 120 can be the devices described above and will not be repeated herein. The communication device may further include other devices such as a network controller, a mobile management entity, or other network entities in the communication system 100, and the disclosure is not limited in this regard.

It should be understood that, the terms "system" and "network" herein are usually used interchangeably throughout this disclosure. The term "and/or" herein only describes an association relationship between associated objects, which means that there can be three relationships. For example, A and/or B can mean A alone, both A and B exist, and B alone. In addition, the character "/" herein, unless otherwise specified, generally indicates that the associated objects are in an "or" relationship.

The following will explain the technical terms used herein.

(1) Downlink Beam Management

In NR, a network side can transmit a downlink physical downlink shared channel (PDSCH) by adopting an analog beam. Before analog beamforming, the network side needs to determine, through downlink beam management, a beam to be adopted. Downlink beam management may be performed based on a channel state information reference signal (CSI-RS) or a synchronization signal block (SSB).

Figure 2:
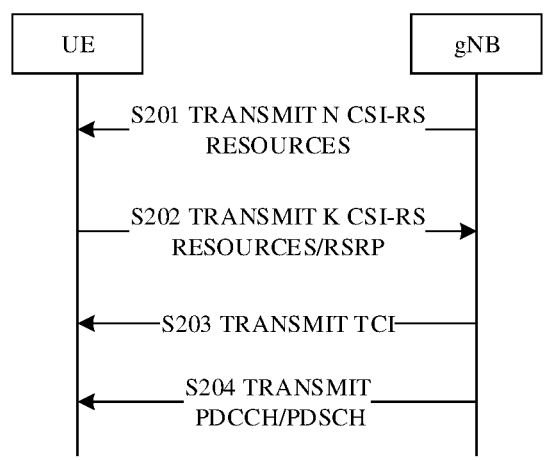
FIG. 2 is a schematic diagram illustrating a channel state information reference signal (CSI-RS)-based downlink beam management process according to implementations.

FIG. 2 is a schematic diagram illustrating a CSI-RS-based downlink beam management process 200 according to implementations. As illustrated in FIG. 2, taking the CSI-RS as an example, the downlink beam management process 200 may include the following.

At S201, a gNB transmits N CSI-RS resources. In other words, the network side transmits to a terminal device (UE) multiple SSBs or multiple CSI-RS resources used for beam management.

At S202, the UE transmits K CSI-RS resources/reference signal receiving powers (RSRP). The terminal device may measure the multiple SSBs or the multiple CSI-RS resources transmitted by a network device, and select some SSBs or CSI-RS resources having the best receiving quality. For example, K CSI-RS resources having the best quality among the N CSI-RS resources are selected. In addition, the terminal device can also report to the network side an index of an SSB or an index of a CSI-RS resource and the RSRP.

At S203, the gNB transmits a transmission configuration indicator (TCI).

At S204, the gNB transmits a physical downlink control channel (PDCCH)/PDSCH. The network side can obtain an optimal SSB or CSI-RS resource according to the SSBs or CSI-RS resources having the best quality reported by the terminal device, and determine a transmit beam used by the optimal SSB or CSI-RS resource as a transmit beam used for downlink transmission, to transmit a downlink control channel or data channel, for example, to transmit the PDCCH or the PDSCH.

In addition, before transmitting the downlink control channel or data channel, the network side will indicate, through a TCI state, to the terminal device a corresponding quasi-co-located (QCL) reference signal, such that the terminal device can adopt a receive beam, which is previously used for receiving the QCL reference signal, to receive the downlink control channel or data channel.

(2) Uplink Beam Management

Figure 3:
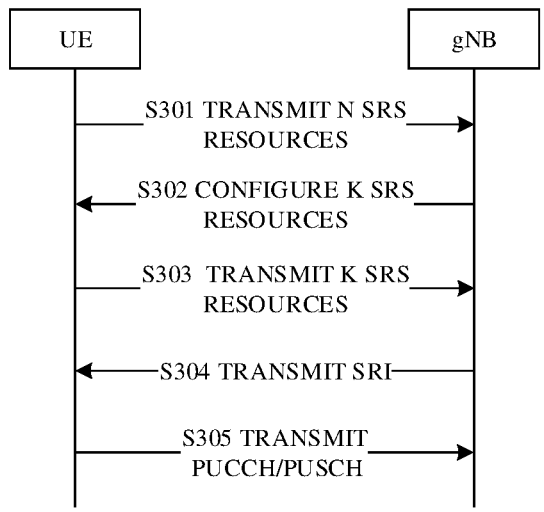
FIG. 3 is a schematic diagram illustrating an uplink beam management process according to implementations.

In NR, the terminal device can transmit uplink data and uplink control information by adopting an analog beam. The terminal device can perform uplink beam management based on a sounding reference signal (SRS), to determine an analog beam used for uplink transmission. FIG. 3 is a schematic diagram illustrating an uplink beam management process 300 according to implementations. As illustrated in FIG. 3, the uplink beam management process 300 may include the following.

At S301, the UE transmits N SRS resources. Before operations at S301, the network side can configure SRS resource set 1 for the terminal device. SRS resource set 1 may include N SRS resources, where N>1. As such, at S301, the terminal device can transmit the N SRS resources by adopting different beams.

At S302, the gNB configures K SRS resources. The network side measures the N SRS resources in terms of receiving quality, and selects K SRS resources having the best receiving quality. The network side can further configure SRS resource set 2, where SRS resource set 2 includes K SRS resources. Then the network side can instruct the terminal device to transmit SRS resources in SRS resource set 2 by adopting analog beam or beams used by the K SRS resources selected from SRS resource set 1. This can be achieved by configuring the K SRS resources selected from SRS resource set 1 respectively as reference SRS resources of K SRS resources in SRS resource set 2.

At S303, the UE transmits the K SRS resources in SRS resource set 2. In other words, the terminal device transmits the K SRS resources in SRS resource set 2 by adopting the analog beam or beams used by the K SRS resources selected from SRS resource set 1.

At S304, the gNB transmits SRS indication (SRI) information. Among the SRS resources in SRS resource set 2 transmitted by the terminal device, the network side can select one SRS resource having the best receiving quality, and notify SRI of the selected SRS resource to the terminal device.

At S305, the UE transmits a physical uplink control channel (PUCCH)/physical uplink shared channel (PUSCH). The terminal device, upon receiving the SRI, determines an analog beam used by the SRS resource indicated by the SRI as an analog beam used for transmitting the PUSCH/PUCCH. For the PUSCH, the SRI may be indicated by an SRI indication field in downlink control information (DCI). For the PUCCH, PUCCH spatial relation information (PUCCH-spatial relation info) for each ACK/NACK feedback resource is configured in radio resource control (RRC) signaling, where the information field includes the SRI.

(3) Non-Coherent Downlink Transmission

In an NR system, multi-TRP-based non-coherent downlink transmission and multi-TRP-based non-coherent uplink transmission have been introduced. Backhaul connection between TRPs may be ideal or non-ideal. In case of an ideal backhaul, multiple TRPs can exchange information quickly and dynamically. In case of a non-ideal backhaul, due to a large delay, the multiple TRPs can only exchange information quasi-statically.

During non-coherent downlink transmission, the multiple TRPs can use different control channels separately to schedule a PDSCH transmission for the terminal device. The scheduled PDSCH may be transmitted in the same slot or in different slots. The terminal device is required to be capable of receiving PDCCHs and PDSCHs from different TRPs at the same time.

Figure 4:
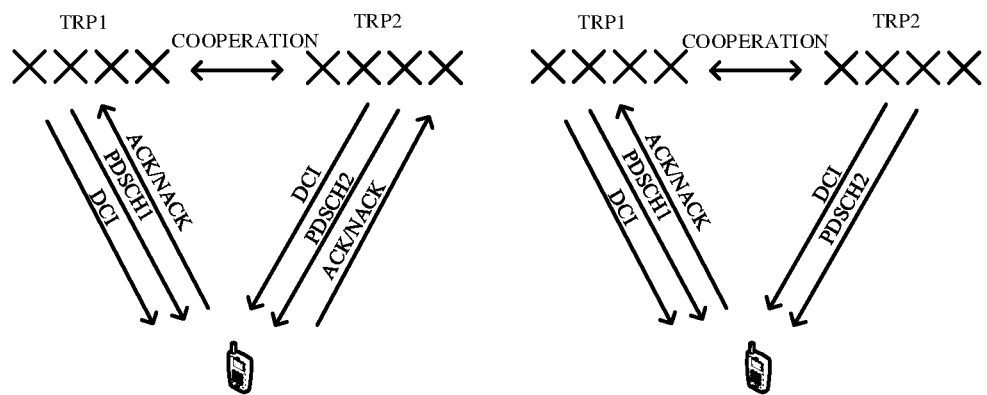
FIG. 4 is a schematic diagram illustrating feedback of acknowledgement (ACK)/negative acknowledgement (NACK) information by a terminal device according to implementations.

FIG. 4 is a schematic diagram illustrating feedback of ACK/NACK information by the terminal device according to implementations. As illustrated in FIG. 4, when the terminal device feeds back ACK/NACK information, the terminal device can feed back each piece of ACK/NACK information to a TRP used for transmitting a PDSCH corresponding to the ACK/NACK information (as illustrated in the left part of FIG. 4), or may combine different pieces of ACK/NACK information and report the combined information to one TRP (as illustrated in the right part of FIG. 4). The former scenario can be applied to an ideal backhaul and a non-ideal backhaul, and the latter scenario can be applied only to an ideal backhaul.

PDSCHs transmitted by different TRPs may carry the same data, which is conducive to PDSCH transmission reliability through multi-TRP diversity transmission. In this scenario, regarding multiple PDSCHs carrying the same data, the terminal device needs to report only one piece of ACK/NACK information.

(4) Uplink Panel

The terminal device may use multiple panels for uplink transmission. A panel includes a group of physical antennae, and each panel has an independent radio frequency channel. The terminal device needs to notify the number of configured panels to the network side in capability reporting. In addition, the terminal device may also need to report to the network side whether the terminal device is capable of transmitting signals via multiple panels simultaneously.

Since different panels correspond to different channel conditions, different panels need to adopt different transmission parameters according to their respective channel information. In order to obtain these transmission parameters, it is necessary to configure different SRS resources for different panels to obtain uplink channel information. For example, in order for uplink beam management, one SRS resource set may be configured for each panel. As such, beam management can be performed separately on each panel to determine an analog beam of the panel. In order to obtain precoding information used for PUSCH transmission, one SRS resource set may be configured for each panel, to obtain transmission parameters adopted by a PUSCH transmitted via the panel, such as beam, precoding vector, the number of transmission layers, etc.

In addition, as illustrated in FIG. 5, multi-panel transmission can also be applied to PUCCH transmission or PUSCH transmission. Multi-panel transmission can be applied to a PUCCH, that is, information carried by the same ACK/NACK feedback resource or ACK/NACK feedback resources on the same time-domain resource may be transmitted to the network side via different panels.

Since ACK/NACK feedback resources corresponding to PDSCHs scheduled by the TRP may be allocated to the same time-domain resource, and the terminal device has no idea of a backhaul condition of the network side, the terminal device does not know how to report multiple pieces of ACK/NACK information on the same time-domain resource.

Therefore, implementations provide a method for uplink feedback information transmission. As such, when ACK/NACK feedback resources corresponding to different PDSCHs are allocated to the same time-domain resource, the terminal device can determine the manner of transmitting ACK/NACK information.

FIG. 6 is a schematic flowchart of a method 400 for uplink feedback information transmission according to implementations. The method 400 may be implemented by a terminal device. The terminal device may be, for example, the terminal device illustrated in FIG. 1. As illustrated in FIG. 6, the method 400 includes the following.

At block S410, the terminal device receives first downlink data and second downlink data, where a first ACK/NACK resource corresponding to first ACK/NACK information of the first downlink data and a second ACK/NACK resource corresponding to second ACK/NACK information of the second downlink data occupy the same time-domain resource.

At block S420, the terminal device transmits the first ACK/NACK information and/or the second ACK/NACK information on the time-domain resource.

It should be understood that, the first downlink data and/or the second downlink data of implementations may refer to any two PDSCHs.

In some implementations, the first ACK/NACK resource and/or the second ACK/NACK resource is a PUCCH resource or a PUSCH resource carrying ACK/NACK information.

"The terminal device receives the first downlink data and the second downlink data" at block S410 may mean that the terminal device receives the first downlink data and the second downlink data from the same network device, or the terminal device receives the first downlink data from a first network device and receives the second downlink data from a second network device.

According to implementations, the first downlink data corresponds to the first ACK/NACK information, that is, the first ACK/NACK information is indicative of whether the terminal device has received the first downlink data successfully. Similarly, the second downlink data corresponds to the second ACK/NACK information, that is, the second ACK/NACK information is indicative of whether the terminal device has received the second downlink data successfully.

In addition, the first ACK/NACK resource corresponding to the first ACK/NACK information and the second ACK/NACK resource corresponding to the second ACK/NACK information occupy the same time-domain resource, where the first ACK/NACK resource and the second ACK/NACK resource may be the same or different.

In some implementations, at block S420, the terminal device can transmit the first ACK/NACK information and/or the second ACK/NACK information on the time-domain resource as follows, where the time-domain resource refers to the same time-domain resource occupied by the first ACK/NACK resource and the second ACK/NACK resource. The terminal device can transmit the first ACK/NACK information and/or the second ACK/NACK information according to a reference information set.

The reference information set may include at least one of: a priority of the first ACK/NACK information and a priority of the second ACK/NACK information, multiplex indication information used to indicate whether multiplex transmission of the first ACK/NACK information and the second ACK/NACK information is supported, whether the first ACK/NACK resource is the same as the second ACK/NACK resource, spatial relation information of the first ACK/NACK resource and spatial relation information of the second ACK/NACK resource, a transmission configuration indicator (TCI) state of the first downlink data and a TCI state of the second downlink data, the number of panels used for transmitting the first ACK/NACK information and the second ACK/NACK information, discrete Fourier transform (DFT) transform precoding configuration, and whether the first downlink data and the second downlink data include the same transmission block.

The multiplex indication information may be configured for the terminal device by a network device. The network device can determine, according to a current backhaul connection condition, whether multiplex transmission is possible for the first ACK/NACK information of the first downlink data (such as PDSCH) and the second ACK/NACK information of the second downlink data. The first downlink data and the second downlink data may be transmitted by different TRPs or panels. For example, the first downlink data may be transmitted to the terminal device by the network device, and the second downlink data may be transmitted to the terminal device by the network device or by other network devices.

If a backhaul connection delay is less than a preset value, the network device determines that ACK/NACK information can be transmitted by multiplex. On the other hand, if the backhaul connection delay is greater than or equal to the preset value, the network device determines that multiplex transmission cannot be performed.

The network device transmits to the terminal device the multiplex indication information regarding ACK/NACK information. The multiplex indication information is used for indicating to the terminal device whether multiplex transmission can be performed on the first ACK/NACK information and second ACK/NACK information. As such, the terminal device can transmit the first ACK/NACK information and/or the second ACK/NACK information according to the multiplex indication information.

It should be understood that, the terminal device may set different preset conditions according to one or more pieces of information in the reference information set. When one of the preset conditions is satisfied, the terminal device performs operations corresponding to the preset condition, that is, transmits ACK/NACK information according to the preset condition. Several types of preset conditions are hereinafter elaborated.

In some implementations, at block S420, the terminal device can determine, according to the reference information set, whether a first preset condition is satisfied. Upon determining that the first preset condition is satisfied, the terminal device transmits the first ACK/NACK information and the second ACK/NACK information simultaneously.

The first preset condition includes at least one of: the multiplex indication information indicates that multiplex transmission of the first ACK/NACK information and the second ACK/NACK information is not supported; the first ACK/NACK resource is different from the second ACK/NACK resource; the spatial relation information of the first ACK/NACK resource and the spatial relation information of the second ACK/NACK resource indicate the same reference signal, or indicate reference signals which are in a QCL relationship; the TCI state of the first downlink data and the TCI state of the second downlink data indicate the same reference signal, or indicate reference signals which are in a QCL relationship; the number of panels used for transmitting the first ACK/NACK information and the second ACK/NACK information is greater than 1; the DFT transform precoding configuration indicates disabling DFT transform precoding; and the first downlink data and the second downlink data contain different transmission blocks.

Regarding the spatial relation information, similar to indicating the same reference signal or reference signals which are in a QCL relationship, a beam or beams used for receiving downlink information and transmitting uplink information, which is indicated by the spatial relation information of the first ACK/NACK resource, is the same as that indicated by the spatial relation information of the second ACK/NACK resource.

Regarding the TCI state, similar to indicating the same reference signal or reference signals which are in a QCL relationship, a beam or beams used for receiving an uplink signal and transmitting a downlink signal, which is indicated by the TCI state of the first downlink data, is the same as that indicated by the TCI state of the second downlink data.

It should be understood that, when the first preset condition includes multiple conditions, "the first preset condition is satisfied" means that all conditions of the first preset condition are satisfied.

In some implementations, the terminal device transmits the first ACK/NACK information and the second ACK/NACK information simultaneously as follows. When the number of panels used for transmitting the first ACK/NACK information and the second ACK/NACK information is greater than 1, the terminal device transmits the first ACK/NACK information and the second ACK/NACK information simultaneously on the time-domain resource via different panels, where the time-domain resource is the same time-domain resource occupied by the first ACK/NACK resource and the second ACK/NACK resource.

Figure 7:
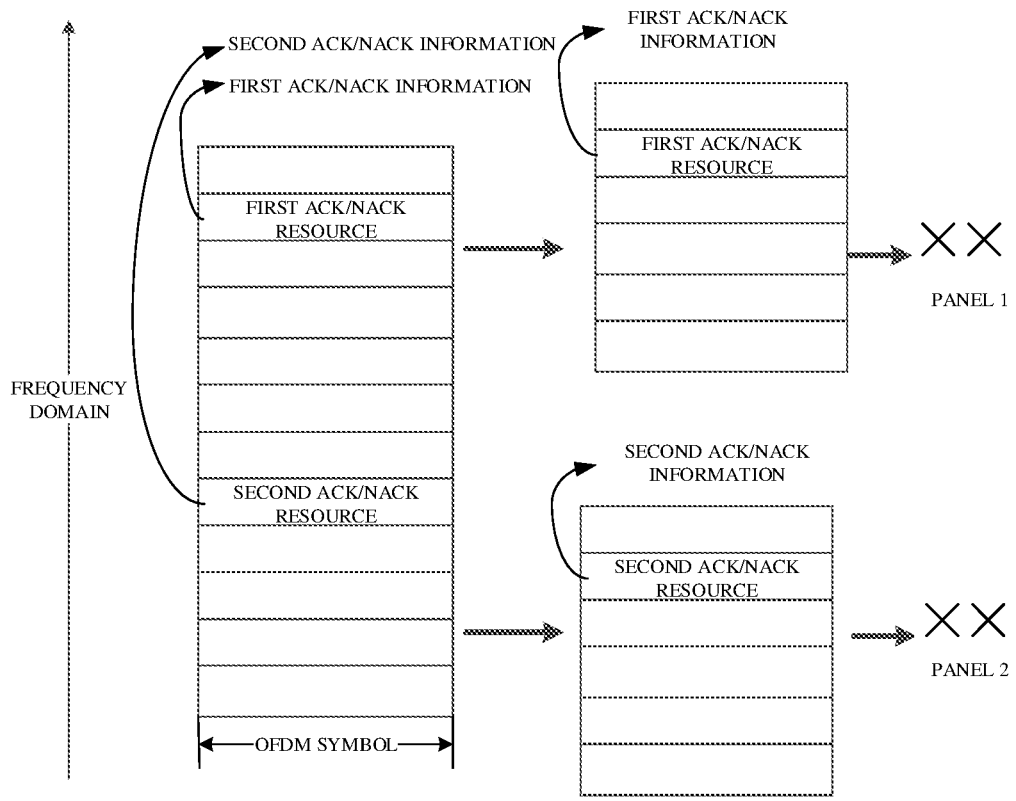
FIG. 7 is a schematic diagram illustrating transmission of ACK/NACK information when the number of panels is greater than 1 according to implementations.

FIG. 7 is a schematic diagram illustrating transmission of ACK/NACK information when the number of panels is greater than 1 according to implementations. As illustrated in FIG. 7, the terminal device transmits the first ACK/NACK information via panel 1, and transmits the second ACK/NACK information via panel 2.

Alternatively, the terminal device transmits the first ACK/NACK information and the second ACK/NACK information simultaneously as follows. If the first ACK/NACK resource is different from the second ACK/NACK resource, the terminal device transmits the first ACK/NACK information on the first ACK/NACK resource and transmits the second ACK/NACK information on the second ACK/NACK resource.

Figure 8:
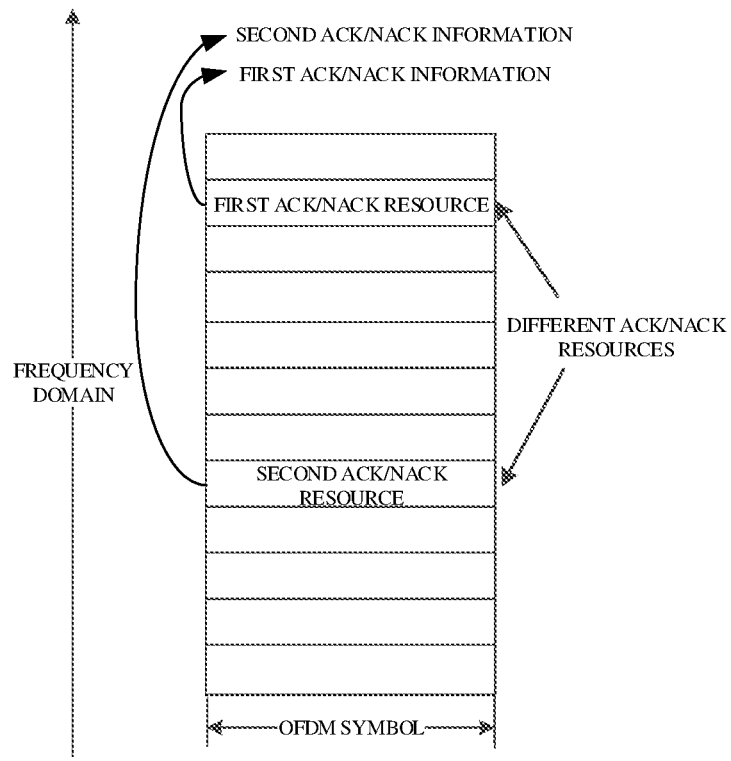
FIG. 8 is a schematic diagram illustrating transmission of ACK/NACK information on different ACK/NACK resources according to implementations.

FIG. 8 is a schematic diagram illustrating transmission of ACK/NACK information on different ACK/NACK resources according to implementations. As illustrated in FIG. 8, the first ACK/NACK resource and the second ACK/NACK resource occupy the same time-domain resource, but the first ACK/NACK resource is different from the second ACK/NACK resource. For example, the first ACK/NACK resource and the second ACK/NACK resource are two PUCCHs. In this scenario, the terminal device can transmit the first ACK/NACK information on the first ACK/NACK resource, and transmit the second ACK/NACK information on the second ACK/NACK resource.

In other implementations, at block S420, when the terminal device determines, according to the reference information set, that a second preset condition is satisfied, the terminal device transmits only one of the first ACK/NACK information and the second ACK/NACK information on the time-domain resource, where the time-domain resource is the same time-domain resource occupied by the first ACK/NACK resource and the second ACK/NACK resource.

The second preset condition includes at least one of: the multiplex indication information indicates that multiplex transmission of the first ACK/NACK information and the second ACK/NACK information is not supported; the first ACK/NACK resource is the same as the second ACK/NACK resource; the spatial relation information of the first ACK/NACK resource and the spatial relation information of the second ACK/NACK resource indicate different reference signals, or indicate reference signals which are not in a QCL relationship; the TCI state of the first downlink data and the TCI state of the second downlink data indicate different reference signals, or indicate reference signals which are not in a QCL relationship; the number of panels used for transmitting the first ACK/NACK information and the second ACK/NACK information is 1; the DFT transform precoding configuration indicates enabling DFT transform precoding; and the first downlink data and the second downlink data include the same transmission block.

If the second preset condition is satisfied, the terminal device transmits only one of the first ACK/NACK information and the second ACK/NACK information. The terminal device may transmit ACK/NACK information with a higher priority, according to the priority of the first ACK/NACK information and the priority of the second ACK/NACK information. For example, if the first ACK/NACK information has a priority higher than the second ACK/NACK information, the terminal device transmits only the first ACK/NACK information on the time-domain resource.

Alternatively, the terminal device may transmit only one of the first ACK/NACK information and the second ACK/NACK information according to the priority of the first ACK/NACK information and the priority of the second ACK/NACK information only. For example, if the first ACK/NACK information has a priority higher than the second ACK/NACK information, the terminal device transmits only the first ACK/NACK information on the time-domain resource.

It should be understood that, the terminal device can determine the priority of the first ACK/NACK information and the priority of the second ACK/NACK information according to one or more pieces of information. For example, the terminal device can determine the priority of the first ACK/NACK information and the priority of the second ACK/NACK information, according to an identifier (ID) or index of a control-resource set (CORESET) to which first downlink control information (DCI) used for scheduling the first downlink data belongs, and an ID or index of a CORESET to which second DCI used for scheduling the second downlink data belongs. A low ID or index of a CORESET to which DCI belongs corresponds to a high priority of ACK/NACK information of downlink data (such as PDSCH) scheduled by the DCI. Alternatively, a high ID or index of a CORESET to which DCI belongs corresponds to a high priority of ACK/NACK information of a PDSCH scheduled by the DCI. A network side may pre-configure multiple CORESETs, where each CORESET has its own ID or index. The terminal device detects DCI in a search space associated with each CORESET. The CORESET to which the first DCI belongs may be different from the CORESET to which the second DCI belongs.

For another example, the terminal device can determine the priority of the first ACK/NACK information and the priority of the second ACK/NACK information according to an ID or index of a search space to which the first DCI belongs and an ID or index of a search space to which the second DCI belongs. A low ID or index of a search space to which DCI belongs corresponds to a high priority of ACK/NACK information of downlink data (such as PDSCH) scheduled by the DCI. Alternatively, a high ID or index of a search space to which DCI belongs corresponds to a high priority of ACK/NACK information of a PDSCH scheduled by the DCI. The network side may pre-configure multiple search spaces, where each search space has its own ID or index. The terminal device detects DCI in each search space. The search space to which the first DCI belongs may be different from the search space to which the second DCI belongs.

For another example, the terminal device can determine the priority of the first ACK/NACK information and the priority of the second ACK/NACK information according to a time order in which the terminal device receives the first DCI and the second DCI. ACK/NACK information of downlink data (such as PDSCH) scheduled by DCI that is first received by the terminal device can be set to have a higher priority. Alternatively, ACK/NACK information of a PDSCH scheduled by DCI that is first received by the terminal device can be set to have a lower priority. The time order in which the terminal device receives the first DCI and the second DCI may be determined according to a slot or time-domain resource of the detected DCI.

For another example, the terminal device can determine the priority of the first ACK/NACK information and the priority of the second ACK/NACK information according to a time order in which the terminal device receives the first downlink data and the second downlink data. ACK/NACK information of downlink data (such as PDSCH) that is first received by the terminal device can be set to have a higher priority. Alternatively, ACK/NACK information of a PDSCH that is first received by the terminal device can be set to have a lower priority. The time order in which the terminal device receives the first downlink data and the second downlink data may be determined according to a slot or time-domain resource of the detected downlink data.

For another example, the terminal device can determine the priority of the first ACK/NACK information and the priority of the second ACK/NACK information according to a DCI format of the first DCI and a DCI format of the second DCI. Priorities of different DCI formats may be agreed in advance between the terminal device and the network device. For instance, ACK/NACK information of a PDSCH scheduled by DCI format 1_0 has a priority higher than ACK/NACK information of a PDSCH scheduled by DCI format 1_1. Since data scheduled by DCI format 1_0 has a high probability of correct detection and is usually more important, in this way, it is possible to avoid unnecessary retransmission and reduce delay of important data.

For another example, the terminal device can determine the priority of the first ACK/NACK information and the priority of the second ACK/NACK information according to a scrambling manner of a cyclic redundancy check (CRC) code of the first DCI and a scrambling manner of a CRC code of the second DCI. Priorities of different CRC scrambling manners may be agreed in advance between the terminal device and the network device. For instance, ACK/NACK information of a PDSCH scheduled by DCI scrambled by modulation and coding scheme (MCS) cell radio network temporary ID (C-RNTI) (MCS-C-RNTI) has a priority higher than ACK/NACK information of a PDSCH scheduled by DCI scrambled by C-RNTI or configured grant RNTI (CS-RNTI). ACK/NACK information of a PDSCH scheduled by DCI scrambled by C-RNTI has a priority higher than ACK/NACK information of a PDSCH scheduled by DCI scrambled by CS-RNTI. Since data carried in a PDSCH scheduled by DCI scrambled by MCS-C-RNTI is data of an ultra reliable & low latency communication (URLLC) service which has higher latency requirements than data of an enhance mobile broadband (eMBB) service, by setting ACK/NACK information of a PDSCH scheduled by DCI scrambled by MCS-C-RNTI to have a higher priority, it is possible to ensure low latency of URLLC. A PDSCH scheduled by DCI scrambled by C-RNTI is data directly scheduled by the network device, and a PDSCH scheduled by DCI scrambled by CS-RNTI is generally data transmitted autonomously by the terminal device, where the former is higher in transmission reliability. Therefore, by setting ACK/NACK information of a PDSCH scheduled by DCI scrambled by C-RNTI to have a higher priority, it is possible to increase an overall transmission speed of a system.

For another example, the terminal device can determine the priority of the first ACK/NACK information and the priority of the second ACK/NACK information, according to a first time interval between receiving the first DCI and receiving the first downlink data, and a second time interval between receiving the second DCI and receiving the second downlink data. A short time interval between receiving DCI and receiving a PDSCH scheduled by the DCI corresponds to a high priority of ACK/NACK information corresponding to the PDSCH, or corresponds to a low priority of ACK/NACK information corresponding to the PDSCH. The first time interval may be indicated to the terminal device by the first DCI, and the second time interval may be indicated to the terminal device by the second DCI.

It should be understood that, various manners of determining a priority of ACK/NACK information described above may be adopted alone or in combination. For example, the terminal device may first determine the priority according to a DCI format. If the DCI format is the same, the terminal device determines the priority according to a time order of receiving downlink data. For another example, the terminal device may first determine the priority according to a scrambling manner of a CRC code of DCI. If the scrambling manner is the same, the terminal device determines the priority according to a DCI format. If the DCI format is the same, the terminal device then determines the priority according to an ID of a CORESET, which is not limited herein.

Figure 9:
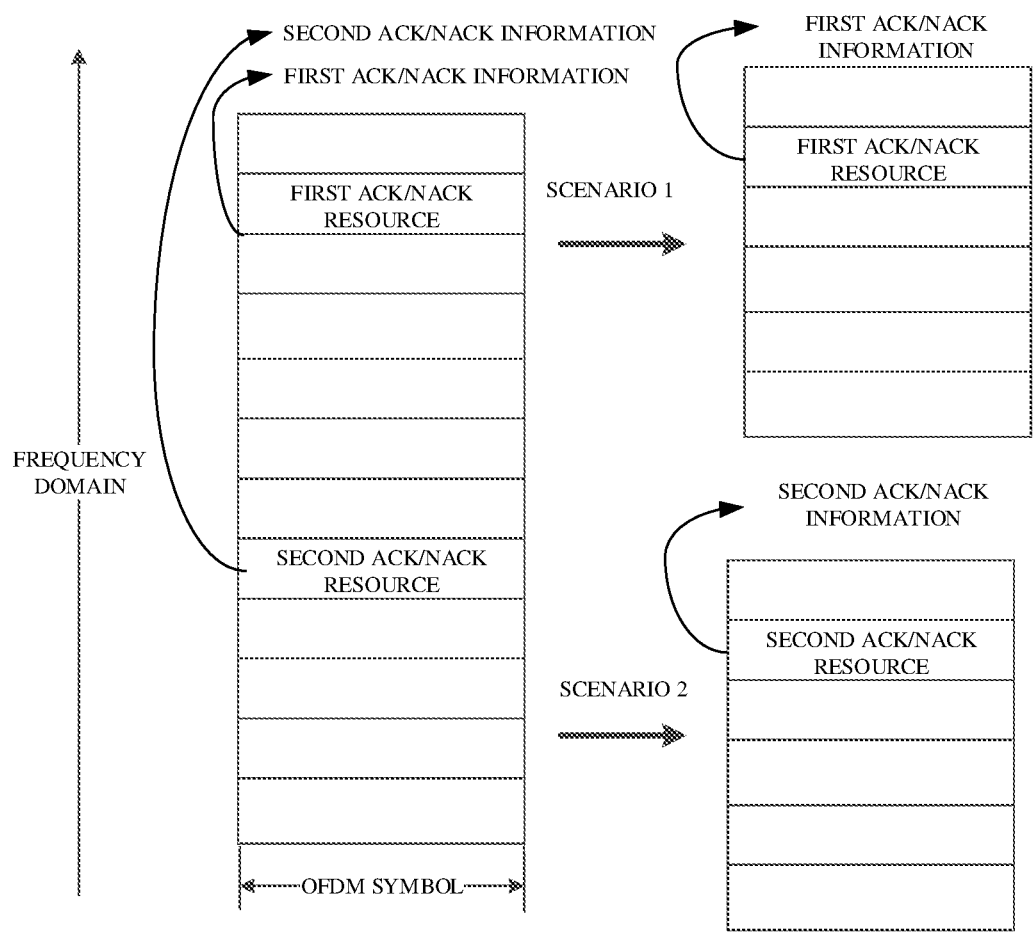
FIG. 9 is a schematic diagram illustrating transmission of one piece of ACK/NACK information by a terminal device according to implementations.

FIG. 9 is a schematic diagram illustrating transmission of one piece of ACK/NACK information by the terminal device according to implementations. As illustrated in FIG. 9, the terminal device may transmit only one of the first ACK/NACK information and the second ACK/NACK information as follows. The terminal device can transmit only the first ACK/NACK information, that is, the terminal device transmits the first ACK/NACK information on the first ACK/NACK resource. Alternatively, the terminal device can transmit only the second ACK/NACK information, that is, the terminal device transmits the second ACK/NACK information on the second ACK/NACK resource.

In some implementations, the first downlink data and the second downlink data contain the same transmission block. For example, the first downlink data is a first PDSCH and the second downlink data is a second PDSCH, where the first PDSCH and the second PDSCH carry the same data-transmission block. The terminal device may transmit only one of the first ACK/NACK information and the second ACK/NACK information as follows. If the first ACK/NACK information is the same as the second ACK/NACK information, the terminal device transmits only the first ACK/NACK information on the time-domain resource. For example, the value of the first ACK/NACK information is the same as that of the second ACK/NACK information, that is, both of the first ACK/NACK information and the second ACK/NACK information indicate ACK information (for example, the value is 0), or indicate NACK information (for example, the value is 1). The terminal device transmits only the first ACK/NACK information on the first ACK/NACK resource, or transmits only the second ACK/NACK information on the second ACK/NACK resource.

Alternatively, if the first ACK/NACK information is different from the second ACK/NACK information, the terminal device transmits, on the time-domain resource, only ACK information in the first ACK/NACK information and the second ACK/NACK information, where the time-domain resource is the same time-domain resource occupied by the first ACK/NACK resource and the second ACK/NACK resource. For example, one of the first ACK/NACK information and the second ACK/NACK information indicates ACK information (for example, the value is 0), and the other one of the first ACK/NACK information and the second ACK/NACK information indicates NACK information (for example, the value is 1). The terminal device transmits only the ACK information in the first ACK/NACK information and the second ACK/NACK information. Exemplarily, if the first ACK/NACK information indicates ACK, and the second ACK/NACK information indicates NACK, the terminal device feeds back only the first ACK/NACK information on the first ACK/NACK resource without feeding back the second ACK/NACK information.

In some implementations, the first downlink data and the second downlink data contain the same transmission block, for example, the first downlink data is the first PDSCH and the second downlink data is the second PDSCH, and the first PDSCH and the second PDSCH carry the same data-transmission block, the terminal device can transmit, on the time-domain resource, information obtained through an "OR" logical operation on the first ACK/NACK information the second ACK/NACK information, where the time-domain resource is the same time-domain resource occupied by the first ACK/NACK resource and the second ACK/NACK resource.

Here, the information obtained through an "OR" logical operation on the first ACK/NACK information the second ACK/NACK information is referred to as third ACK/NACK information. The third ACK/NACK information may be transmitted on the first ACK/NACK resource, or may be transmitted on the second ACK/NACK resource, or may be transmitted on a third ACK/NACK resource that is additionally configured by the network device.

According to implementations, supposing that ACK/NACK information has a value of 1 when indicating ACK, and has a value of 0 when indicating NACK, the terminal device can perform an "OR" logical operation on the value of the first ACK/NACK information and the value of the second ACK/NACK information, to obtain the third ACK/NACK information. If both of the value of the first ACK/NACK information and the value of the second ACK/NACK information are 0 (NACK), the value of the third ACK/NACK information is 0 (NACK). If one of the value of the first ACK/NACK information and the value of the second ACK/NACK information is 1 (ACK), the value of the third ACK/NACK information is 1 (ACK).

In other implementations, at block S420, the terminal device can determine, according to the reference information set, whether a third preset condition is satisfied. Upon determining that the third preset condition is satisfied, the terminal device performs multiplex transmission on the first ACK/NACK information and the second ACK/NACK information on the time-domain resource, where the time-domain resource is the same time-domain resource occupied by the first ACK/NACK resource and the second ACK/NACK resource.

The third preset condition includes at least one of: the multiplex indication information indicates that multiplex transmission of the first ACK/NACK information and the second ACK/NACK information is supported; the first ACK/NACK resource is the same as the second ACK/NACK resource; the spatial relation information of the first ACK/NACK resource and the spatial relation information of the second ACK/NACK resource indicate the same reference signal, or indicate reference signals which are in a QCL relationship; the TCI state of the first downlink data and the TCI state of the second downlink data indicate the same reference signal, or indicate reference signals which are in a QCL relationship; the number of panels used for transmitting the first ACK/NACK information and the second ACK/NACK information is 1; the DFT transform precoding configuration indicates enabling DFT transform precoding; and the first downlink data and the second downlink data carry different data-transmission blocks.

Figure 10:
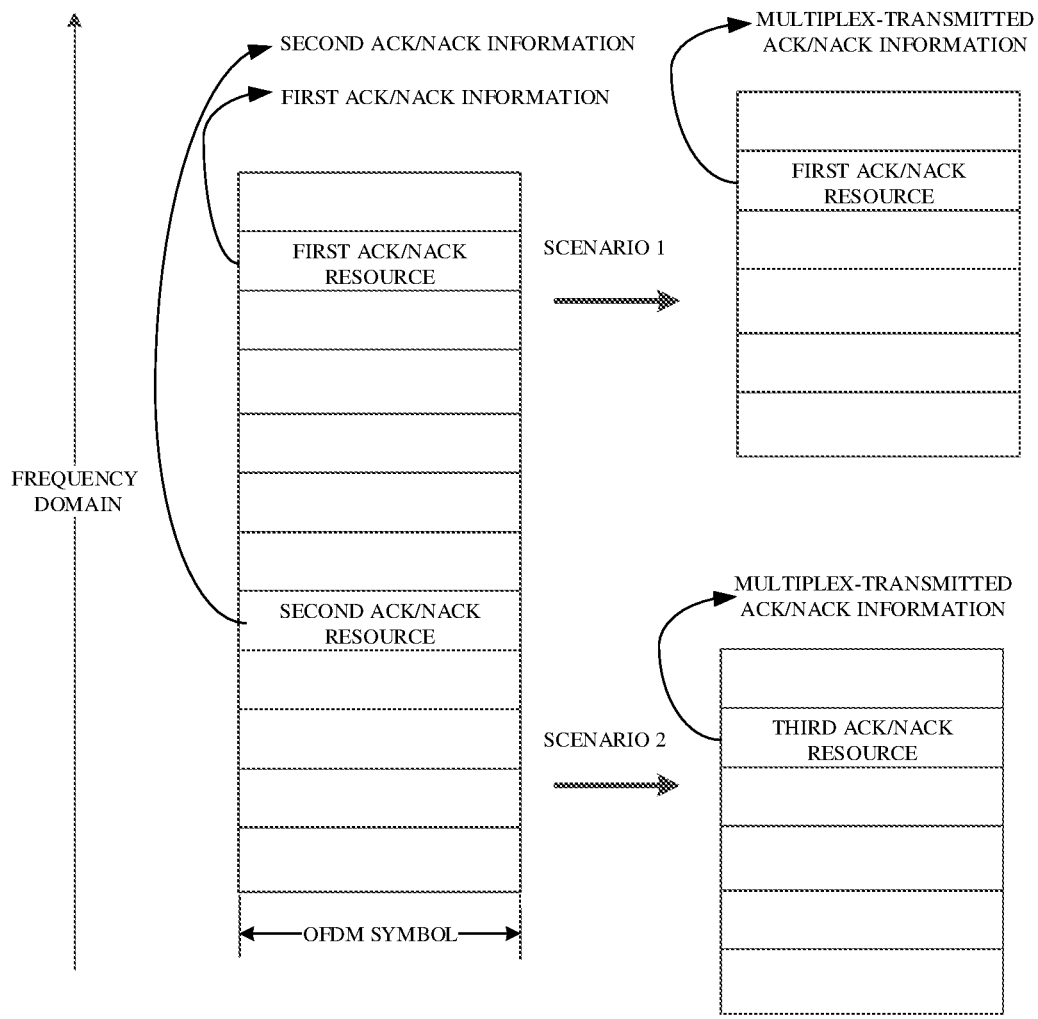
FIG. 10 is a schematic diagram illustrating multiplex transmission of ACK/NACK information by a terminal device according to implementations.

In some implementations, the multiplex transmission may be performed as follows. The terminal device performs cascade or joint encoding on the first ACK/NACK information and the second ACK/NACK information, and transmits the obtained information on the same ACK/NACK resource. FIG. 10 is a schematic diagram illustrating multiplex transmission of ACK/NACK information according to implementations. As illustrated in FIG. 10, the terminal device may transmit multiplexed ACK/NACK information on the first ACK/NACK resource, or may transmit the multiplexed ACK/NACK information on the second ACK/NACK resource, or may transmit the multiplexed ACK/NACK information on the third ACK/NACK resource that is additionally configured by the network device, and the disclosure is not limited in this regard.

According to the method for uplink feedback information transmission provided herein, when ACK/NACK resources corresponding to different PDSCHs are allocated to the same time-domain resource, the terminal device can determine, according to one or more pieces of reference information, how to transmit ACK/NACK information. For example, according to a current backhaul condition, the network side may instruct the terminal device whether multiplex transmission or contention transmission is adopted for multiple pieces of ACK/NACK information, which only requires low higher layer signaling overhead. In addition, the terminal device can determine, according to whether ACK/NACK resources or PDSCHs adopt the same transmit beam, whether different PDSCHs/PUCCHs come from the same TRP or are transmitted to the same TRP, so as to determine whether to multiplex and transmit the information to the same TRP, which requires no additional signaling overhead. Furthermore, the terminal device can determine, according to the number of panels, whether multiple pieces of ACK/NACK information can be transmitted via different panels. If the terminal device has to discard one or some of the multiple pieces of ACK/NACK information, for each of the multiple pieces of ACK/NACK information, the terminal device can determine a priority of the ACK/NACK information according to scheduling information of a PDSCH corresponding to the ACK/NACK information, to determine ACK/NACK information to be transmitted. According to the same priority rule, the network device can correctly receive the ACK/NACK information.

The following will describe in detail the method for uplink feedback information transmission of implementations in connection with some specific examples.

Suppose that the network device schedules the first downlink data (for example, the first PDSCH) by using the first DCI, and schedules the second downlink data (for example, the second PDSCH) by using the second DCI. The first PDSCH and the second PDSCH may be transmitted by different TRPs or panels, or may be transmitted by the same TRP or panel. The first PDSCH and the second PDSCH may be transmitted in the same slot, or may be transmitted in different slots.

The network device indicates, through the first DCI, the first ACK/NACK resource used for transmitting the first ACK/NACK information of the first PDSCH from pre-configured ACK/NACK resources, and indicates, through the second DCI, the second ACK/NACK resource used for transmitting the second ACK/NACK information of the second PDSCH from the pre-configured ACK/NACK resources. The ACK/NACK resource referred to herein may be a PUCCH resource or a PUSCH resource carrying ACK/NACK.

The first ACK/NACK resource and the second ACK/NACK resource occupy the same time-domain resource. The first ACK/NACK resource and the second ACK/NACK resource may be different ACK/NACK resources in the same time-domain resource, or may be the same ACK/NACK resource. The time-domain resource herein may be an orthogonal frequency division multiplexing (OFDM) symbol.

It should be understood that, the first PDSCH and the second PDSCH may carry the same data-transmission block, or carry different data-transmission blocks. As an example, the first PDSCH and the second PDSCH carry different data-transmission blocks, in other words, the first PDSCH and second PDSCH adopt different hybrid automatic repeat request (HARM) processes.

The terminal device receives the first DCI and the second DCI, and receives the first PDSCH scheduled by the first DCI and the second PDSCH scheduled by the second DCI. The terminal device obtains, from the first DCI, the first ACK/NACK resource used for transmitting the first ACK/NACK information of the first PDSCH, and obtains, from the second DCI, the second ACK/NACK resource used for transmitting the second ACK/NACK information of the second PDSCH. The first ACK/NACK resource and the second ACK/NACK resource occupy the same time-domain resource. For the sake of brevity, unless otherwise specified, the time-domain resource below refers to the same time-domain resource occupied by the first ACK/NACK resource and the second ACK/NACK resource.

The terminal device can determine, according to the reference information set, ACK/NACK information to be transmitted on the time-domain resource in the first ACK/NACK information and the second ACK/NACK information. The terminal device can determine the ACK/NACK information to be transmitted on the time-domain resource in any one of the following methods.

Method 1

The terminal device can determine, according to the multiplex indication information regarding ACK/NACK information (that is, ACK/NACK multiplex indication information) transmitted by the network device, whether multiplex transmission can be performed on the first ACK/NACK information and the second ACK/NACK information on the time-domain resource, to determine the ACK/NACK information to be transmitted.

The ACK/NACK multiplex indication information is indicative of whether multiplex transmission can be performed on the first ACK/NACK information and the second ACK/NACK information. The multiplex indication information can be notified in advance to the terminal device via higher layer signaling.

If the ACK/NACK multiplex indication information indicates that multiplexing of ACK/NACK information is supported, the terminal device can transmit ACK/NACK information on the time-domain resource by multiplex. For example, the terminal device can perform cascade or joint encoding on the first ACK/NACK information and the second ACK/NACK information and transmit the obtained information on one ACK/NACK resource. As illustrated in FIG. 10, the one ACK/NACK resource may be the first ACK/NACK resource used for transmitting the first ACK/NACK information, or may be the second ACK/NACK resource used for transmitting the second ACK/NACK information. The terminal device and the network device may negotiate in advance which one of the first ACK/NACK resource and the second ACK/NACK resource is used. In addition, the network device may also configure the third ACK/NACK resource used for transmitting multiplexed ACK/NACK information. The terminal device determines a transmit beam according to spatial relation information of the ACK/NACK resource selected by the terminal device.

If the ACK/NACK multiplex indication information indicates that multiplexing of ACK/NACK information is not supported, the terminal device can determine, according to other conditions, how to transmit ACK/NACK information. As an example, the terminal device can select, from the first ACK/NACK information and the second ACK/NACK information, ACK/NACK information having a higher priority, and transmit the selected ACK/NACK information on the time-domain resource. In this scenario, the terminal device will discard ACK/NACK information having a lower priority.

The terminal device may determine the priority of the first ACK/NACK information and the priority of the second ACK/NACK information in one of the following manners.

Manner 1: The terminal device determines a priority of ACK/NACK information of a scheduled PDSCH according to the ID or index of the CORESET to which the first DCI belongs and the ID or index of the CORESET to which the second DCI belongs. A low (or high) ID or index of a CORESET to which DCI belongs corresponds to a high priority of the ACK/NACK information of a PDSCH scheduled by the DCI. The network side may pre-configure multiple CORESETs, where each CORESET has its own ID or index. The terminal device detects DCI in a search space associated with each CORESET. The CORESET to which the first DCI belongs may be different from the CORESET to which the second DCI belongs.

Manner 2: The terminal device determines a priority of ACK/NACK information of a scheduled PDSCH according to the ID or index of the search space to which the first DCI belongs and the ID or index of the search space to which the second DCI belongs. A low (or high) ID or index of a search space to which DCI belongs corresponds to a high priority of the ACK/NACK information of a PDSCH scheduled by the DCI. The network side may pre-configure multiple search spaces, where each search space has its own ID or index. The terminal device detects DCI in each search space. The search space to which the first DCI belongs may be different from the search space to which the second DCI belongs.

Manner 3: The terminal device determines a priority of ACK/NACK information of a scheduled PDSCH according to the time order in which the terminal device receives the first DCI and the second DCI. ACK/NACK information of a PDSCH scheduled by DCI that is first received by the terminal device has a higher priority (or has a lower priority). The time order in which the terminal device receives the first DCI and the second DCI may be determined according to a slot or time-domain resource of the detected DCI.

Manner 4: The terminal device determines a priority of ACK/NACK information of the first PDSCH and a priority of ACK/NACK information of the second PDSCH, according to the time order in which the terminal device receives the first PDSCH and the second PDSCH. ACK/NACK information of a PDSCH that is first received by the terminal device has a higher priority (or has a lower priority). The time order in which the terminal device receives the first PDSCH and the second PDSCH may be determined according to a slot or a starting time-domain resource of the received PDSCH.

Manner 5: The terminal device determines a priority of ACK/NACK information of a scheduled PDSCH according to the DCI format of the first DCI and the DCI format of the second DCI. Priorities of different DCI formats may be agreed in advance between the terminal device and the network device. For instance, ACK/NACK information of a PDSCH scheduled by DCI format 1_0 has a priority higher than ACK/NACK information of a PDSCH scheduled by DCI format 1_1. Since data scheduled by DCI format 1_0 has a high probability of correct detection and is usually more important, in this way, it is possible to avoid unnecessary retransmission and reduce delay of important data.

Manner 6: The terminal device determines a priority of ACK/NACK information of a scheduled PDSCH according to the scrambling manner of the CRC code of the first DCI and the scrambling manner of the CRC code of the second DCI. Priorities of different CRC scrambling manners may be agreed in advance between the terminal device and the network device. For instance, ACK/NACK information of a PDSCH scheduled by DCI scrambled by MCS-C-RNTI has a priority higher than ACK/NACK information of a PDSCH scheduled by DCI scrambled by C-RNTI or CS-RNTI. ACK/NACK information of a PDSCH scheduled by DCI scrambled by C-RNTI has a priority higher than ACK/NACK information of a PDSCH scheduled by DCI scrambled by CS-RNTI. Since data carried in a PDSCH scheduled by DCI scrambled by MCS-C-RNTI is data of an URLLC service which has higher latency requirements than data of an eMBB service, by setting ACK/NACK information of a PDSCH scheduled by DCI scrambled by MCS-C-RNTI to have a higher priority, it is possible to ensure low latency of URLLC. A PDSCH scheduled by DCI scrambled by C-RNTI is data directly scheduled by the network device, and a PDSCH scheduled by DCI scrambled by CS-RNTI is data generally transmitted autonomously by the terminal device, where the former is higher in transmission reliability. Therefore, by setting ACK/NACK information of a PDSCH scheduled by DCI scrambled by C-RNTI to have a higher priority, it is possible to increase an overall transmission speed of a system.

Manner 7: The terminal device determines a priority of ACK/NACK information of the first PDSCH and a priority of ACK/NACK information of the second PDSCH, according to a time interval between receiving the first DCI and receiving the first PDSCH, and a time interval between receiving the second DCI and receiving the second PDSCH. A short time interval between receiving DCI and receiving a PDSCH scheduled by the DCI corresponds to a high priority (or low priority) of ACK/NACK information corresponding to the PDSCH. The time interval may be indicated to the terminal device by the first DCI and the second DCI.

It should be understood that, the terminal device may determine the priority of the first ACK/NACK information and the priority of the second ACK/NACK information in a combination of the above manners. For example, the terminal device may first determine the priority according to a DCI format. If the DCI format is the same, the terminal device then determines the priority according to a time order of receiving DCI. For another example, the terminal device may first determine the priority according to a scrambling manner of a CRC code of DCI. If the scrambling manner is the same, the terminal device determines the priority according to a DCI format. If the DCI format is the same, the terminal device then determines the priority according to an ID of a CORESET.

The terminal device may also adopt the multiplex indication information regarding ACK/NACK information in combination with other reference information. As an example, the multiplex indication information regarding ACK/NACK information is adopted in combination with another one piece of reference information.

For example, the terminal device may determine the ACK/NACK information to be transmitted, according to the multiplex indication information of ACK/NACK information as well as the spatial relation information of the first ACK/NACK resource and the spatial relation information of the second ACK/NACK resource. Exemplarily, when the multiplex indication information indicates that ACK/NACK information multiplexing is not supported, if the spatial relation information of the first ACK/NACK resource and the spatial relation information of the second ACK/NACK resource indicate the same reference signal, or indicate reference signals which are in a QCL relationship, multiplex transmission can still be performed on the first ACK/NACK information and the second ACK/NACK information; otherwise, multiplex transmission cannot be performed on the first ACK/NACK information and the second ACK/NACK information.

For another example, the terminal device may determine the ACK/NACK information to be transmitted, according to the multiplex indication information of ACK/NACK information as well as a TCI state of the first PDSCH and a TCI state of the second PDSCH. Exemplarily, when the multiplex indication information indicates that ACK/NACK information multiplexing is not supported, if the TCI state of the first PDSCH and the TCI state of the second PDSCH indicate the same reference signal, or indicate reference signals which are in a QCL relationship, multiplex transmission can still be performed on the first ACK/NACK information and the second ACK/NACK information; otherwise, multiplex transmission cannot be performed on the first ACK/NACK information and the second ACK/NACK information.

For another example, the terminal device may determine the ACK/NACK information to be transmitted, according to the multiplex indication information of ACK/NACK information as well as the number of panels used for ACK/NACK transmission (i.e. the number of panels used for transmitting the first ACK/NACK information and the second ACK/NACK information). Exemplarily, when the multiplex indication information indicates that ACK/NACK information multiplexing is not supported, if the number of panels is greater than 1, the terminal device may transmit the first ACK/NACK information and the second ACK/NACK information simultaneously via different panels; otherwise, the terminal device can only transmit one of the first ACK/NACK information and the second ACK/NACK information.

For another example, the terminal device may determine the ACK/NACK information to be transmitted, according to the ACK/NACK multiplex indication information as well as the DFT transform precoding configuration. Exemplarily, when the multiplex indication information indicates that ACK/NACK information multiplexing is not supported, if the DFT transform precoding configuration indicates that DFT transform precoding is not allowed, the terminal device may transmit the first ACK/NACK information and the second ACK/NACK information simultaneously on different ACK/NACK resources; otherwise, the terminal device can only transmit one of the first ACK/NACK information and the second ACK/NACK information.

Alternatively, the terminal device may adopt the multiplex indication information regarding ACK/NACK information in combination with multiple pieces of other reference information, which will not be enumerated herein.

Therefore, if a backhaul between TRPs is ideal, the multiplex indication information can indicate that ACK/NACK information multiplexing is supported. As such, ACK/NACK information of PDSCHs from different TRPs can be transmitted to one TRP, which is possible to save ACK/NACK resources and on the other hand, avoid discarding ACK/NACK information. If a backhaul between TRPs is non-ideal, the multiplex indication information can indicate that ACK/NACK information multiplexing is not supported, which is possible to ensure that ACK/NACK information of a PDSCH from at least one TRP can be normally fed back to the network device.

Method 2

The terminal device can determine, according to whether the first ACK/NACK resource is the same as the second ACK/NACK resource, whether the first ACK/NACK information and the second ACK/NACK information can be transmitted on the time-domain resource by multiplex, to determine the ACK/NACK information to be transmitted.

If the first ACK/NACK resource is the same as the second ACK/NACK resource, the terminal device can perform multiplex transmission on the first ACK/NACK information and the second ACK/NACK information. For example, the terminal device can perform cascade or joint encoding on the first ACK/NACK information and the second ACK/NACK information, and transmit the obtained information on the same ACK/NACK resource.

If the first ACK/NACK resource is different from the second ACK/NACK resource, the terminal device may further determine, according to other conditions, how to transmit ACK/NACK information. Alternatively, the terminal device may select, from the first ACK/NACK information and the second ACK/NACK information, ACK/NACK information having a higher priority, and transmit the selected ACK/NACK information on the time-domain resource. For details of determining the priority, reference can be made to related descriptions in the above method 1, which will not be elaborated again herein.

If the first ACK/NACK resource is different from the second ACK/NACK resource, the terminal device can further determine how to transmit ACK/NACK information according to other reference information. As an example, another one piece of reference information may be further considered by the terminal device.

For example, the terminal device can determine the ACK/NACK information to be transmitted, according to whether an ACK/NACK resource corresponding to the first PDSCH (i.e. the first ACK/NACK resource) is the same as an ACK/NACK resource corresponding to the second PDSCH (i.e. the second ACK/NACK resource) as well as corresponding spatial relation information (that is, spatial relation information of the ACK/NACK resource corresponding to the first PDSCH and spatial relation information of the ACK/NACK resource corresponding to the second PDSCH). Exemplarily, when the first ACK/NACK resource is different from the second ACK/NACK resource, if the spatial relation information of the first ACK/NACK resource and the spatial relation information of the second ACK/NACK resource indicate the same reference signal, or indicate reference signals which are in a QCL relationship, the terminal device can transmit the first ACK/NACK information and the second ACK/NACK information simultaneously, as illustrated in FIG. 8; otherwise, the terminal device can only transmit ACK/NACK information having a higher priority.

For another example, the terminal device can determine the ACK/NACK information to be transmitted, according to the ACK/NACK resource corresponding to the first PDSCH and the ACK/NACK resource corresponding to the second PDSCH as well as the TCI state of the first PDSCH and the TCI state of the second PDSCH. Exemplarily, when the first ACK/NACK resource is different from the second ACK/NACK resource, if the TCI state of the first PDSCH and the TCI state of the second PDSCH indicate the same reference signal, or indicate reference signals which are in a QCL relationship, the terminal device can transmit the first ACK/NACK information and the second ACK/NACK information simultaneously, as illustrated in FIG. 8; otherwise, the terminal device can only transmit ACK/NACK information having a higher priority.

For another example, the terminal device can determine the ACK/NACK information to be transmitted, according to the ACK/NACK resource corresponding to the first PDSCH and the ACK/NACK resource corresponding to the second PDSCH as well as the number of panels used for ACK/NACK transmission. Exemplarily, when the first ACK/NACK resource is different from the second ACK/NACK resource, if the number of panels is greater than 1, the terminal device can transmit the first ACK/NACK information and the second ACK/NACK information simultaneously via different panels, as illustrated in FIG. 7; otherwise, the terminal device can only transmit ACK/NACK information having a higher priority.

For another example, the terminal device can determine the ACK/NACK information to be transmitted, according to the ACK/NACK resource corresponding to the first PDSCH and the ACK/NACK resource corresponding to the second PDSCH as well as the DFT transform precoding configuration. Exemplarily, when the first ACK/NACK resource is different from the second ACK/NACK resource, if the DFT transform precoding configuration indicates DFT transform precoding is not allowed, the terminal device can transmit the first ACK/NACK information and the second ACK/NACK information simultaneously on different ACK/NACK resources, as illustrated in FIG. 8; otherwise, the terminal device can only transmit ACK/NACK information having a higher priority.

As such, when the network device wants the terminal device to report multiplexed ACK/NACK information, the network device can configure the same resource for different ACK/NACK information, thereby saving ACK/NACK resources. When the network device has no ideal backhaul, the network device can configure different ACK/NACK resources, such that the terminal device can report the multiple pieces of ACK/NACK information respectively on different resources or reports only one piece of ACK/NACK information.

Method 3

The terminal device determines the ACK/NACK information to be transmitted on the time-domain resource, according to whether the spatial relation information of the first ACK/NACK resource and the spatial relation information of the second ACK/NACK resource indicate the same reference signal, or indicate reference signals which are in a QCL relationship.

If the ACK/NACK resource is a PUCCH resource, the spatial relation information can be configured in advance respectively for each ACK/NACK resource via higher layer signaling. If the ACK/NACK resource is a PUSCH resource, the spatial relation information may be notified to the terminal device via DCI used for scheduling the PUSCH. The following will take only the PUCCH resource as an example.

If the spatial relation information of the first ACK/NACK resource and the spatial relation information of the second ACK/NACK resource indicate the same reference signal, or indicate reference signals which are in a QCL relationship, the terminal device can perform multiplex transmission on the first ACK/NACK information and the second ACK/NACK information. For example, the terminal device can perform cascade or joint encoding on the first ACK/NACK information and the second ACK/NACK information and transmit the obtained information on the same ACK/NACK resource, as illustrated in FIG. 10. Alternatively, the terminal device can transmit the first ACK/NACK information and the second ACK/NACK information simultaneously on different ACK/NACK resources respectively.

The above rule can be applied only to a scenario where the first ACK/NACK resource is different from the second ACK/NACK resource. When the first ACK/NACK resource is the same as second ACK/NACK resource, the terminal device needs to discard one of the first ACK/NACK information and the second ACK/NACK information according to the priority or other information, or further determine, according to other information, the ACK/NACK information to be transmitted.

If the spatial relation information of the first ACK/NACK resource and the spatial relation information of the second ACK/NACK resource indicate different reference signals, or indicate reference signals which are not in a QCL relationship, the terminal device can further determine how to transmit ACK/NACK information, according to other reference information. Alternatively, the terminal device can directly select, from the first ACK/NACK information and the second ACK/NACK information, ACK/NACK information having a higher priority, and transmit the selected ACK/NACK information on the time-domain resource. For details of determining the priority, reference can be made to related descriptions in method 1, which will not be elaborated again herein.

As an example, if the spatial relation information of the first ACK/NACK resource and the spatial relation information of the second ACK/NACK resource indicate different reference signals, or indicate reference signals which are not in a QCL relationship, the terminal device can further determine, according to other reference information, how to transmit ACK/NACK information. For example, the terminal device can determine the ACK/NACK information to be transmitted, according to the spatial relation information of the first ACK/NACK resource and the spatial relation information of the second ACK/NACK resource as well as the number of panels used for ACK/NACK transmission. Exemplarily, when the spatial relation information of the first ACK/NACK resource and the spatial relation information of the second ACK/NACK resource indicate different reference signals, or indicate reference signals which are not in a QCL relationship, if the number of panels is greater than 1, the terminal device can transmit the first ACK/NACK information and the second ACK/NACK information simultaneously via different panels; otherwise, the terminal device can only transmit ACK/NACK information having a higher priority.

Method 4

The terminal device determines the ACK/NACK information to be transmitted on the time-domain resource, according to whether the TCI state of the first PDSCH and the TCI state of the second PDSCH indicate the same reference signal, or indicate reference signals which are in a QCL relationship.

The TCI state of the first PDSCH and the TCI state of the second PDSCH can be notified to the terminal device via TCI-state indication information carried in DCI used for scheduling the first PDSCH and TCI-state indication information carried in DCI used for scheduling the second PDSCH respectively.

If the TCI state of the first PDSCH and the TCI state of the second PDSCH indicate the same reference signal, or indicate reference signals which are in a QCL relationship, the first ACK/NACK information and the second ACK/NACK information can be transmitted by multiplex. For example, the terminal device can perform cascade or joint encoding on the first ACK/NACK information and the second ACK/NACK information and transmit the obtained information on the same ACK/NACK resource, as illustrated in FIG. 10. Alternatively, the terminal device can transmit the first ACK/NACK information and the second ACK/NACK information simultaneously on different ACK/NACK resources respectively.

The above rule can be applied only to a scenario where the ACK/NACK resource of the first PDSCH is different from the ACK/NACK resource of the second PDSCH. When the ACK/NACK resource of the first PDSCH is the same as the ACK/NACK resource of the second PDSCH, the terminal device needs to discard one of the first ACK/NACK information and the second ACK/NACK information according to the priority or other information, or further determine, according to other information, the ACK/NACK information to be transmitted.

If the TCI state of the first PDSCH and the TCI state of the second PDSCH indicate different reference signals, or indicate reference signals which are not in a QCL relationship, the terminal device can further determine, according to other reference information, how to transmit ACK/NACK information. Alternatively, the terminal device can select, from the first ACK/NACK information and the second ACK/NACK information, ACK/NACK information having a higher priority, and transmit the selected ACK/NACK information on the time-domain resource. For details of determining the priority, reference can be made to related descriptions in method 1, which will not be elaborated again herein.

For example, the terminal device can determine the ACK/NACK information to be transmitted, according to the TCI state of the first PDSCH and the TCI state of the second PDSCH as well as the number of panels used for ACK/NACK transmission. Exemplarily, when the TCI state of the first PDSCH and the TCI state of the second PDSCH indicate different reference signals, or indicate reference signals which are not in a QCL relationship, if the number of panels is greater than 1, the terminal device can transmit the first ACK/NACK information and the second ACK/NACK information simultaneously via different panels; otherwise, the terminal device can only transmit ACK/NACK information having a higher priority.

Method 5

The terminal device determines, according to the number of panels used for ACK/NACK transmission, the ACK/NACK information to be transmitted on the time-domain resource.

The number of panels may be reported in advance to the network device as capability information of the terminal device. If the terminal device is capable of transmitting ACK/NACK via N panels simultaneously, the number of panels is N.

If the number of panels is greater than 1, the terminal device can transmit the first ACK/NACK information and the second ACK/NACK information simultaneously via different panels, without determining the priority.

If the number of panels is 1, the terminal device needs to further determine, according to other information, the ACK/NACK information to be transmitted on the time-domain resource.

For example, the terminal device can determine, according to the ACK/NACK multiplex indication information transmitted by the network device, whether ACK/NACK multiplexing is supported. If multiplex transmission is supported, the terminal device performs cascade or joint encoding on the first ACK/NACK information and the second ACK/NACK information, and transmit the obtained information on the same ACK/NACK resource, as illustrated in FIG. 10. If multiplex transmission is not supported, the terminal device selects, from the first ACK/NACK information and the second ACK/NACK information, ACK/NACK information having a higher priority, and transmits the selected ACK/NACK information on the time-domain resource. For details of determining the priority, reference can be made to related descriptions in method 1, which will not be elaborated again herein.

For another example, the terminal device can determine, according to the spatial relation information of the first ACK/NACK resource and the spatial relation information of the second ACK/NACK resource, the ACK/NACK information to be transmitted. For instance, if the spatial relation information of the first ACK/NACK resource and the spatial relation information of the second ACK/NACK resource indicate the same reference signal, or indicate reference signals which are in a QCL relationship, the terminal device can still transmit the first ACK/NACK information and the second ACK/NACK information simultaneously; otherwise, the terminal device can only transmit ACK/NACK information having a higher priority.

For another example, the terminal device can determine, according to the TCI state of the first PDSCH and the TCI state of the second PDSCH, the ACK/NACK information to be transmitted. For instance, if the TCI state of the first PDSCH and the TCI state of the second PDSCH indicate the same reference signal, or indicate reference signals which are in a QCL relationship, the terminal device can still transmit the first ACK/NACK information and the second ACK/NACK information simultaneously; otherwise, the terminal device can only transmit ACK/NACK information having a higher priority.

For another example, the terminal device can determine, according to whether the first ACK/NACK resource is the same as the second ACK/NACK resource, the ACK/NACK information to be transmitted. For instance, if the first ACK/NACK resource is the same as the second ACK/NACK resource, the terminal device can perform cascade or joint encoding on the first ACK/NACK information and the second ACK/NACK information, and transmit the obtained information on the same ACK/NACK resource. If the first ACK/NACK resource is different from the second ACK/NACK resource, the terminal device needs to select, from the first ACK/NACK information and the second ACK/NACK information, ACK/NACK information having a higher priority, and transmits the selected ACK/NACK information on the time-domain resource.

Method 6

The terminal device determines, according to the DFT transform precoding configuration, the ACK/NACK information to be transmitted on the time-domain resource.

The DFT transform precoding configuration may be configured by the network side via higher layer signaling and used for PUSCH transmission.

If the DFT transform precoding configuration indicates enabling DFT transform precoding, that is, a current uplink multiple access mode is discrete Fourier transform-spread OFDM (DFT-S-OFDM), the terminal device needs to select, from the first ACK/NACK information and the second ACK/NACK information, ACK/NACK information having a higher priority, and transmits the selected ACK/NACK information on the time-domain resource. For details of determining the priority, reference can be made to related descriptions in method 1, which will not be elaborated again herein.

If the DFT transform precoding configuration indicates disabling DFT transform precoding, that is, the current uplink multiple access mode is cyclic prefix OFDM (CP-OFDM), the terminal device can transmit the first ACK/NACK information and the second ACK/NACK information on the time-domain resource simultaneously on different ACK/NACK resources.

The above has elaborated several methods of transmitting ACK/NACK information by the terminal device when the first PDSCH and the second PDSCH carry different data blocks. The following will elaborate transmission of ACK/NACK information when the first PDSCH and the second PDSCH carry the same data block.

The terminal device receives the first DCI and the second DCI, and the first PDSCH and the second PDSCH which carry the same data-transmission block and are respectively scheduled by the first DCI and the second DCI.

The terminal device obtains, according to the first DCI, the first ACK/NACK resource used for transmitting the first ACK/NACK information of the first PDSCH, and obtains, according to the second DCI, the second ACK/NACK resource used for transmitting the second ACK/NACK information of the second PDSCH, where the first ACK/

NACK resource and the second ACK/NACK resource occupy the same time-domain resource.

The terminal device transmits the first ACK/NACK information of the first PDSCH or the second ACK/NACK information of the second PDSCH on the time-domain resource, or obtains the third ACK/NACK information based on the first ACK/NACK information and the second ACK/NACK information and transmits the obtained third ACK/NACK information on the time-domain resource.

As an example, when the value of the first ACK/NACK information is different from that of the second ACK/NACK information, for example, one of the first ACK/NACK information and the second ACK/NACK information indicates ACK information (for example, the value is 0) and the other one of the first ACK/NACK information and the second ACK/NACK information indicates NACK information (for example, the value is 1), the terminal device transmits only the ACK information in the first ACK/NACK information and the second ACK/NACK information. Exemplarily, if the first ACK/NACK information indicates ACK, and the second ACK/NACK information indicates NACK, the terminal device feeds back only the first ACK/NACK information on the first ACK/NACK resource without feeding back the second ACK/NACK information. For details thereof, reference can be made to implementations illustrated in FIG. 9.

As another example, when the value of the first ACK/NACK information is the same as that of the second ACK/NACK information, for example, both of the first ACK/NACK information and the second ACK/NACK information indicate ACK information (for example, the value is 0), or indicate NACK information (for example, the value is 1), the terminal device transmits only the first ACK/NACK information on the first ACK/NACK resource, or transmits only the second ACK/NACK information on the second ACK/NACK resource, in other words, the terminal device can transmit any one of the first ACK/NACK information and the second ACK/NACK information.

As another example, the terminal device can perform an "OR" logical operation on the first ACK/NACK information and the second ACK/NACK information to obtain the third ACK/NACK information, and transmit the obtained third ACK/NACK information on the time-domain resource.

The third ACK/NACK information may be transmitted on the first ACK/NACK resource, or may be transmitted on the second ACK/NACK resource, or may be transmitted on the third ACK/NACK resource that is additionally configured by the network device.

According to implementations, supposing that ACK/NACK information has a value of 1 when indicating ACK, and has a value of 0 when indicating NACK, the terminal device can perform an "OR" logical operation on the value of the first ACK/NACK information and the value of the second ACK/NACK information, to obtain the third ACK/NACK information. If both of the value of the first ACK/NACK information and the value of the second ACK/NACK information are 0 (NACK information), the value of the third ACK/NACK information is 0 (NACK information). If one of the value of the first ACK/NACK information and the value of the second ACK/NACK information is 1 (ACK information), the value of the third ACK/NACK information is 1 (ACK information).

According to the method for uplink feedback information transmission provided herein, when ACK/NACK resources corresponding to different PDSCHs are allocated to the same time-domain resource, the terminal device can determine, according to one or more pieces of reference information, how to transmit ACK/NACK information. For example, according to a current backhaul condition, the network side may instruct the terminal device whether multiplex transmission or contention transmission is adopted for multiple pieces of ACK/NACK information, which only requires low higher layer signaling overhead. In addition, the terminal device can determine, according to whether ACK/NACK resources or PDSCHs adopt the same transmit beam, whether different PDSCHs/PUCCHs come from the same TRP or are transmitted to the same TRP, so as to determine whether to transmit the information to the same TRP by multiplex, which requires no additional signaling overhead. Furthermore, the terminal device can determine, according to the number of panels, whether multiple pieces of ACK/NACK information can be transmitted via different panels. If the terminal device has to discard one or some of the multiple pieces of ACK/NACK information, for each of the multiple pieces of ACK/NACK information, the terminal device can determine a priority of the ACK/NACK information according to scheduling information of a PDSCH corresponding to the ACK/NACK information, to determine the ACK/NACK information to be transmitted. According to the same priority rule, the network device can correctly receive the ACK/NACK information.

It should be understood that, in order to avoid collision of ACK/NACK information, when allocating ACK/NACK resources, the network side may be required to avoid allocating ACK/NACK resources corresponding to different PDSCHs to the same time-domain resource. Alternatively, when a backhaul connection is ideal, the network device can allocate ACK/NACK resources corresponding to different PDSCHs to the same time-domain resource, such that the terminal device can perform multiplex transmission. When the backhaul connection is non-ideal, the network device can allocate ACK/NACK resources corresponding to different PDSCHs to different time-domain resources, to avoid ACK/NACK collision. In this scenario, as long as ACK/NACK information corresponding to different PDSCHs is transmitted on the same time-domain resource, multiplex transmission can be performed by the terminal device without further consideration.

The method for uplink feedback information transmission of implementations performed by the terminal device has been described in detail in connection with FIG. 1 to FIG. 10. The following will describe in detail a method for uplink feedback information transmission of implementations performed by a network device in connection with FIG. 11.

Figure 11:
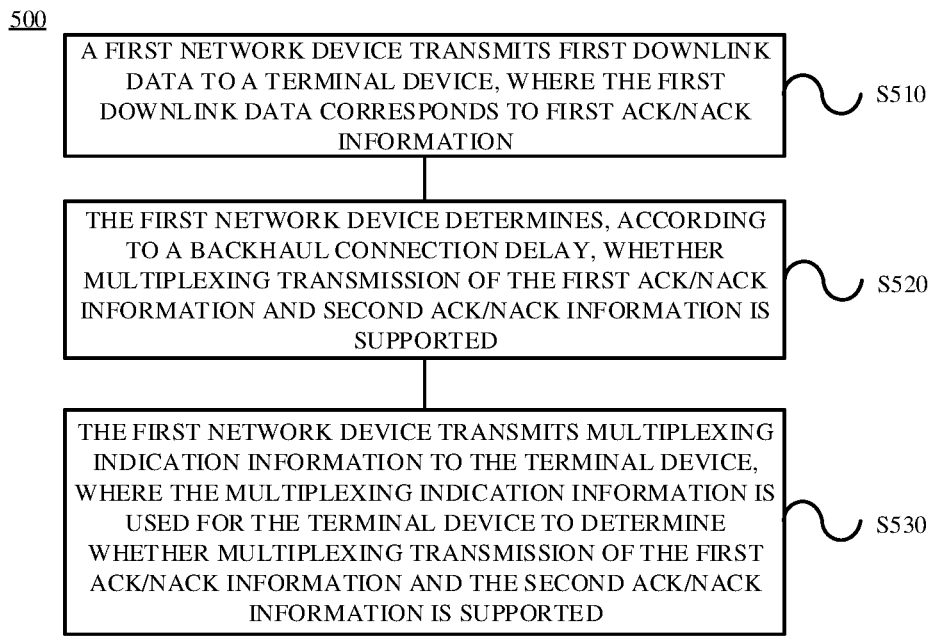
FIG. 11 is a schematic flowchart of a method for uplink feedback information transmission according to other implementations.

FIG. 11 is a schematic flowchart of a method 500 for uplink feedback information transmission according to other implementations. The method 500 may be implemented by the network device illustrated in FIG. 1. The network device may be, for example, the network device illustrated in FIG. 1. The network device herein may be referred to as a first network device. As illustrated in FIG. 11, the method 500 includes the following. At block S510, a first network device transmits first downlink data to a terminal device, where the first downlink data corresponds to first ACK/NACK information. At block S520, the first network device determines, according to a backhaul connection delay, whether multiplex transmission of the first ACK/NACK information and second ACK/NACK information is supported, where the second ACK/NACK information corresponds to second downlink data transmitted by a second network device, and the first ACK/NACK information and the second ACK/NACK information occupy the same time-domain resource. At block S530, the first network device transmits multiplex indication information to the terminal device, where the multiplex indication information is used to indicate whether multiplex transmission of the first ACK/NACK information and the second ACK/NACK information is supported.

In some implementations, the first network device determines, according to the backhaul connection delay, whether multiplex transmission of the first ACK/NACK information and the second ACK/NACK information is supported as follows. When the backhaul connection delay is greater than or equal to a preset value, the first network device determines that the multiplex transmission is not supported. Alternatively, when the backhaul connection delay is less than the preset value, the first network device determines that the multiplex transmission is supported.

In some implementations, the method 500 further includes the following. The first network device receives target ACK/NACK information transmitted by the terminal device, where the target ACK/NACK information is determined by the terminal device according to the multiplex indication information, and the target ACK/NACK information includes the first ACK/NACK information and/or the second ACK/NACK information.

In some implementations, when the multiplex indication information indicates that the first network device supports the multiplex transmission, the target ACK/NACK information is multiplex-transmitted information based on the first ACK/NACK information and the second ACK/NACK information. Alternatively, when the multiplex indication information indicates that the first network device does not support the multiplex transmission, the target ACK/NACK information is the first ACK/NACK information.

In some implementations, in the multiplex transmission, the target ACK/NACK information is information obtained by performing, by the terminal device, cascade or joint encoding on the first ACK/NACK information and the second ACK/NACK information.

According to the method provided herein, when ACK/NACK resources corresponding to different PDSCHs are allocated to the same time-domain resource, a network side may instruct, according to a current backhaul condition, the terminal device whether multiplex transmission is performed on multiple pieces of ACK/NACK information or contention transmission is adopted, which only requires low higher layer signaling overhead.

It should be understood that, in various implementations described herein, the magnitude of a sequence number of each process does not mean an order of execution, and the order of execution of each process should be determined by its function and an internal logic and shall not constitute any limitation to an implementation process of implementations.

The term "and/or" herein only describes an association relationship between associated objects, which means that there can be three relationships. For example, A and/or B can mean A alone, both A and B exist, and B alone. In addition, the character "/" herein, unless otherwise specified, generally indicates that the associated objects are in an "or" relationship.

The methods for uplink feedback information transmission of implementations have been described in detail in the foregoing description with reference to FIG. 1 to FIG. 11. The following will describe in detail a terminal device and a network device of implementations with reference to FIG. 12 to FIG. 16.

Figure 12:
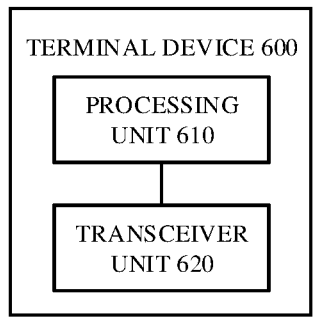
FIG. 12 is a schematic block diagram of a terminal device according to implementations.

As illustrated in FIG. 12, a terminal device 600 of implementations includes a processing unit 610 and a transceiver unit 620. The transceiver unit 620 is configured to receive first downlink data and second downlink data, where a first ACK/NACK resource corresponding to first ACK/NACK information of the first downlink data and a second ACK/NACK resource corresponding to second ACK/NACK information of the second downlink data occupy the same time-domain resource. The transceiver unit 620 is further configured to transmit the first ACK/NACK information and/or the second ACK/NACK information on the time-domain resource.

In some implementations, the transceiver unit 620 is configured to transmit the first ACK/NACK information and/or the second ACK/NACK information on the time-domain resource according to a reference information set, where the reference information set includes at least one of: a priority of the first ACK/NACK information and a priority of the second ACK/NACK information; multiplex indication information used for determining whether multiplex transmission of the first ACK/NACK information and the second ACK/NACK information is supported; whether the first ACK/NACK resource is the same as the second ACK/NACK resource; spatial relation information of the first ACK/NACK resource and spatial relation information of the second ACK/NACK resource; a TCI state of the first downlink data and a TCI state of the second downlink data; the number of panels used for transmitting the first ACK/NACK information and the second ACK/NACK information; DFT transform precoding configuration; and whether the first downlink data and the second downlink data include the same transmission block.

In some implementations, the transceiver unit 620 is configured to transmit the first ACK/NACK information and the second ACK/NACK information simultaneously on the time-domain resource, when the processing unit 610 determines, according to the reference information set, that a first preset condition is satisfied, where the first preset condition includes at least one of: the multiplex indication information indicates that multiplex transmission of the first ACK/NACK information and the second ACK/NACK information is not supported; the first ACK/NACK resource is different from the second ACK/NACK resource; the spatial relation information of the first ACK/NACK resource and the spatial relation information of the second ACK/NACK resource indicate the same reference signal, or indicate reference signals which are in a QCL relationship; the TCI state of the first downlink data and the TCI state of the second downlink data indicate the same reference signal, or indicate reference signals which are in a QCL relationship; the number of panels used for transmitting the first ACK/NACK information and the second ACK/NACK information is greater than 1; the DFT transform precoding configuration indicates disabling DFT transform precoding; and the first downlink data and the second downlink data include different transmission blocks.

In some implementations, the transceiver unit 620 is configured to transmit the first ACK/NACK information on the first ACK/NACK resource and transmit the second ACK/NACK information on the second ACK/NACK resource when the first ACK/NACK resource is different from the second ACK/NACK resource; and/or transmit the first ACK/NACK information and the second ACK/NACK information simultaneously on the time-domain resource via different panels when the number of panels used for transmitting the first ACK/NACK information and the second ACK/NACK information is greater than 1.

In other implementations, the transceiver unit 620 is configured to transmit only one of the first ACK/NACK information and the second ACK/NACK information on the time-domain resource, when the processing unit 610 determines, according to the reference information set, that a second preset condition is satisfied, where the second preset condition includes at least one of: the multiplex indication information indicates that multiplex transmission of the first ACK/NACK information and the second ACK/NACK information is not supported; the first ACK/NACK resource is the same as the second ACK/NACK resource; the spatial relation information of the first ACK/NACK resource and the spatial relation information of the second ACK/NACK resource indicate different reference signals, or indicate reference signals which are not in a QCL relationship; the TCI state of the first downlink data and the TCI state of the second downlink data indicate different reference signals, or indicate reference signals which are not in a QCL relationship; the number of panels used for transmitting the first ACK/NACK information and the second ACK/NACK information is 1; the DFT transform precoding configuration indicates enabling DFT transform precoding; and the first downlink data and the second downlink data include the same transmission block.

In some implementations, the transceiver unit 620 is further configured to transmit only the first ACK/NACK information on the time-domain resource, when the first ACK/NACK information is has a priority higher than the second ACK/NACK information.

In some implementations, the processing unit 610 is further configured to determine the priority of the first ACK/NACK information and the priority of the second ACK/NACK information, according to at least one of: an ID or index of a CORESET to which first DCI used for scheduling the first downlink data belongs, and an ID or index of a CORESET to which second DCI used for scheduling the second downlink data belongs; an ID or index of a search space to which the first DCI belongs and an ID or index of a search space to which the second DCI belongs; a time order in which the transceiver unit 620 receives the first DCI and the second DCI; a time order in which the transceiver unit 620 receives the first downlink data and the second downlink data; a DCI format of the first DCI and a DCI format of the second DCI; a scrambling manner of a CRC code of the first DCI and a scrambling manner of a CRC code of the second DCI; and a first time interval between receiving the first DCI and receiving the first downlink data, and a second time interval between receiving the second DCI and receiving the second downlink data.

In some implementations, the first downlink data and the second downlink data include the same transmission block, and the transceiver unit 620 is configured to transmit only the first ACK/NACK information on the time-domain resource when the first ACK/NACK information is the same as the second ACK/NACK information; and/or transmit, on the time-domain resource, only ACK information in the first ACK/NACK information and the second ACK/NACK information when the first ACK/NACK information is different from the second ACK/NACK information.

In other implementations, the transceiver unit 620 is configured to perform multiplex transmission on the first ACK/NACK information and the second ACK/NACK information on the time-domain resource, when the processing unit 610 determines, according to the reference information set, that a third preset condition is satisfied, where the third preset condition includes at least one of: the multiplex indication information indicates that multiplex transmission of the first ACK/NACK information and the second ACK/NACK information is supported; the first ACK/NACK resource is the same as the second ACK/NACK resource; the spatial relation information of the first ACK/NACK resource and the spatial relation information of the second ACK/NACK resource indicate the same reference signal, or indicate reference signals which are in a QCL relationship; the TCI state of the first downlink data and the TCI state of the second downlink data indicate the same reference signal, or indicate reference signals which are in a QCL relationship; the number of panels used for transmitting the first ACK/NACK information and the second ACK/NACK information is 1; the DFT transform precoding configuration indicates enabling DFT transform precoding; and the first downlink data and the second downlink data carry different data-transmission blocks.

In some implementations, the transceiver unit 620 is configured to perform cascade or joint encoding on the first ACK/NACK information and the second ACK/NACK information, and transmit the obtained information on the same ACK/NACK resource.

In some implementations, the transceiver unit 620 is configured to transmit, on the time-domain resource, information obtained through an OR logical operation on the first ACK/NACK information the second ACK/NACK information, when the first downlink data and the second downlink data include the same transmission block.

In some implementations, an ACK/NACK resource is a PUCCH resource or a PUSCH resource in which ACK/NACK information is carried.

It should be understood that, the terminal device 600 provided herein may be configured to implement the method 400 of implementations. The above and other operations and/or functions of various units of the terminal device 600 are respectively intended to realize corresponding operations performed by a terminal device in various methods illustrated in FIG. 1 to FIG. 11, which will not be repeated herein for the sake of brevity.

In the terminal device provided herein, when ACK/NACK resources corresponding to different PDSCHs are allocated to the same time-domain resource, the terminal device can determine, according to one or more pieces of reference information, how to transmit ACK/NACK information. For example, according to a current backhaul condition, a network side may instruct the terminal device whether multiplex transmission or contention transmission is adopted for multiple pieces of ACK/NACK information, which only requires low higher layer signaling overhead. In addition, the terminal device can determine, according to whether ACK/NACK resources or PDSCHs adopt the same transmit beam, whether different PDSCHs/PUCCHs come from the same TRP or are transmitted to the same TRP, so as to determine whether to transmit the information to the same TRP by multiplex, which requires no additional signaling overhead. Furthermore, the terminal device can determine, according to the number of panels, whether multiple pieces of ACK/NACK information can be transmitted via different panels. If the terminal device has to discard one or some of the multiple pieces of ACK/NACK information, for each of the multiple pieces of ACK/NACK information, the terminal device can determine a priority of the ACK/NACK information according to scheduling information of a PDSCH corresponding to the ACK/NACK information, to determine ACK/NACK information to be transmitted. According to the same priority rule, a network device can correctly receive the ACK/NACK information.

Figure 13:
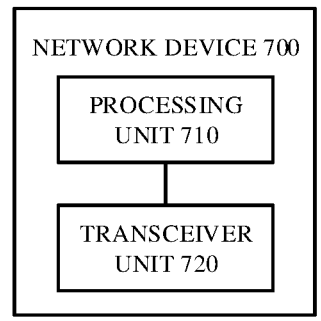
FIG. 13 is a schematic block diagram of a network device according to implementations.

As illustrated in FIG. 13, a network device 700 includes a processing unit 710 and a transceiver unit 720. The transceiver unit 720 is configured to transmit first downlink data to a terminal device, where the first downlink data corresponds to first ACK/NACK information. The processing unit 710 is configured to determine, according to a backhaul connection delay, whether multiplex transmission of the first ACK/NACK information and second ACK/NACK information is supported, where the second ACK/NACK information corresponds to second downlink data transmitted by a second network device, and the first ACK/NACK information and the second ACK/NACK information occupy the same time-domain resource. The transceiver unit 720 is further configured to transmit multiplex indication information to the terminal device, where the multiplex indication information is used for the terminal device to determine whether multiplex transmission of the first ACK/NACK information and the second ACK/NACK information is supported.

In some implementations, the processing unit 710 is configured to determine that the multiplex transmission is not supported when the backhaul connection delay is greater than or equal to a preset value; or determine that the multiplex transmission is supported when the backhaul connection delay is less than the preset value.

In some implementations, the transceiver unit 720 is further configured to receive target ACK/NACK information transmitted by the terminal device, where the target ACK/NACK information is determined by the terminal device according to the multiplex indication information, and the target ACK/NACK information includes the first ACK/NACK information and/or the second ACK/NACK information.

In some implementations, when the multiplex indication information indicates that the network device supports the multiplex transmission, the target ACK/NACK information is multiplex-transmitted information based on the first ACK/NACK information and the second ACK/NACK information. Alternatively, when the multiplex indication information indicates that the network device does not support the multiplex transmission, the target ACK/NACK information is the first ACK/NACK information.

In some implementations, in the multiplex transmission, the target ACK/NACK information is information obtained by performing, by the terminal device, cascade or joint encoding on the first ACK/NACK information and the second ACK/NACK information.

It should be understood that, the network device 700 provided herein may be configured to implement the method 500 of implementations. The above and other operations and/or functions of various units of the network device 700 are respectively intended to realize corresponding operations performed by a network device in various methods illustrated in FIG. 1 to FIG. 11, which will not be repeated herein for the sake of brevity.

In the network device provided herein, when ACK/NACK resources corresponding to different PDSCHs are allocated to the same time-domain resource, the network device may instruct, according to a current backhaul condition, the terminal device whether multiplex transmission is performed on multiple pieces of ACK/NACK information or contention transmission is adopted, which only requires low higher layer signaling overhead.

Figure 14:
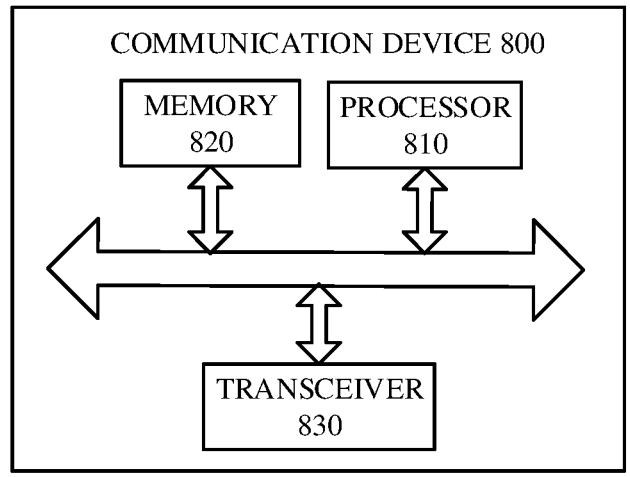
FIG. 14 is a schematic block diagram of a communication device according to implementations.

FIG. 14 is a schematic structural diagram of a communication device 800 according to implementations. As illustrated in FIG. 14, the communication device 800 includes a processor 810. The processor 810 can invoke and execute computer programs stored in a memory to perform the method provided in implementations.

As illustrated in FIG. 14, the communication device 800 can further include the memory 820. The processor 810 can invoke and execute the computer programs stored in the memory 820 to perform the method provided in implementations.

The memory 820 may be a separate device independent of the processor 810, or may be integrated into the processor 810.

As illustrated in FIG. 14, the communication device 800 can further include a transceiver 830. The processor 810 can control the transceiver 830 to communicate with other devices, for example, to send information or data to other devices, or to receive information or data from other devices.

The transceiver 830 may include a transmitter and a receiver. The transceiver 830 may further include an antenna, where one or more antenna can be provided.

The communication device 800 may be operable as the network device of implementations, and the communication device 800 can implement the operations performed by the network device described in the foregoing method implementations, which will not be repeated herein for the sake of simplicity.

Alternatively, the communication device 800 may be operable as the mobile terminal/the terminal device of implementations, and the communication device 800 can implement the operations performed by the mobile terminal/the terminal device described in the foregoing method implementations, which will not be repeated herein for the sake of simplicity.

Figure 15:
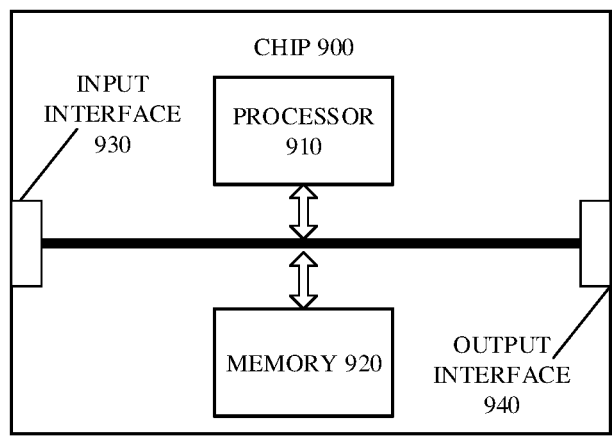
FIG. 15 is a schematic block diagram of a chip according to implementations.

FIG. 15 is a schematic structural diagram of a chip according to implementations. As illustrated in FIG. 15, the chip 900 includes a processor 910. The processor 910 is configured to invoke and execute computer programs stored in a memory to perform the method provided in implementations.

As illustrated in FIG. 15, the chip 900 further includes the memory 920. The processor 910 can invoke and execute the computer programs stored in the memory 920 to perform the method provided in implementations.

The memory 920 may be a separate device independent of the processor 910, or may be integrated into the processor 910.

The chip 900 may further include an input interface 930. The processor 910 can control the input interface 930 to communicate with other devices or chips, for example, to acquire information or data sent by other devices or chips.

The chip 900 may further include an output interface 940. The processor 910 can control the output interface 940 to communicate with other devices or chips, for example, to output information or data to other devices or chips.

The chip is applicable to the network device of implementations. The chip can implement the operations performed by the network device described in the foregoing method implementations, which will not be repeated herein for the sake of simplicity.

Alternatively, the chip is applicable to the mobile terminal/the terminal device. The chip can implement the operations performed by the mobile terminal/the terminal device described in the foregoing method implementations, which will not be repeated herein for the sake of simplicity.

It should be understood that, the chip herein may also be referred to as a system-on-chip (SOC).

Figure 16:
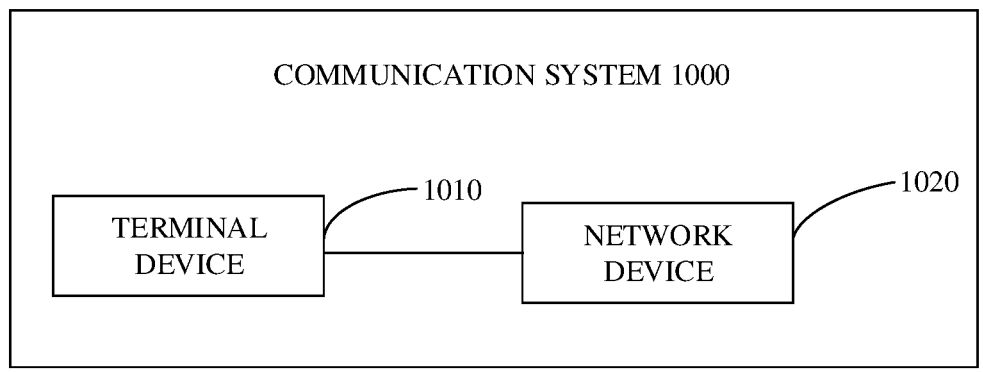
FIG. 16 is a schematic diagram of a communication system according to implementations.

FIG. 16 is a schematic block diagram of a communication system 1000 according to implementations. As illustrated in FIG. 16, the communication system 1000 includes a terminal device 1010 and a network device 1020.

The terminal device 1010 can implement functions of the terminal device described in the foregoing method implementations, and the network device 1020 can implement functions of the network device described in the foregoing method implementations, which will not be repeated herein for the sake of simplicity.

The processor referred to herein may be an integrated circuit chip with signal processing capabilities. During implementation, each step of the foregoing method may be completed by an integrated logic circuit of hardware in the processor or an instruction in the form of software. The processor may be a general-purpose processor, a digital signal processor (DSP), an application specific integrated circuit (ASIC), a field programmable gate array (FPGA), or other programmable logic devices, discrete gates or transistor logic devices, discrete hardware components. The methods, steps, and logic blocks disclosed in implementations can be implemented or executed. The general purpose processor may be a microprocessor, or the processor may be any conventional processor or the like. The steps of the method disclosed in implementations may be directly implemented as a hardware decoding processor, or may be performed by hardware and software modules in the decoding processor. The software module can be located in a storage medium such as a random access memory (RAM), a flash memory, a read only memory (ROM), a programmable ROM (PROM), or an electrically erasable programmable memory, registers, and the like. The storage medium is located in the memory. The processor reads the information in the memory, and completes the steps of the method described above with the hardware thereof.

It can be understood that, the memory according to implementations may be a volatile memory or a non-volatile memory, or may include both the volatile memory and the non-volatile memory. The non-volatile memory may be a ROM, a PROM, an erasable PROM (EPROM), an electrically EPROM (EEPROM), or flash memory. The volatile memory can be a RAM that acts as an external cache. By way of example but not limitation, many forms of RAM are available, such as a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM), and a direct rambus RAM (DR RAM). The memory of the systems and methods described herein is intended to include, but is not limited to, these and any other suitable types of memory.

It should be understood that, the above description of the memory is intended for illustration rather than limitation. For example, the memory of implementations may also be an SRAM, a DRAM, an SDRAM, a DDR SDRAM, an ESDRAM, an SLDRAM, a DR RAM, etc.

In other words, the memory of implementations is intended to include, but is not limited to, these and any other suitable types of memory.

Implementations further provide a computer readable storage medium. The computer readable storage medium is configured to store computer programs.

The computer readable storage medium is applicable to the network device of implementations. The computer programs, when executed, are operable with a computer to implement the operations performed by the network device described in the foregoing method implementations, which will not be repeated herein for the sake of simplicity.

Alternatively, the computer readable storage medium is applicable to the mobile terminal/the terminal device. The computer programs, when executed, are operable with a computer to implement the operations performed by the mobile terminal/the terminal device described in the foregoing method implementations, which will not be repeated herein for the sake of simplicity.

Implementations further provide a computer program product. The computer program product includes computer program instructions.

The computer program product is applicable to the network device of implementations. The computer program instructions, when executed, are operable with a computer to implement the operations performed by the network device described in the foregoing method implementations, which will not be repeated herein for the sake of simplicity.

Alternatively, the computer program product is applicable to the mobile terminal/the terminal device. The computer program instructions, when executed, are operable with a computer to implement the operations performed by the mobile terminal/the terminal device described in the foregoing method implementations, which will not be repeated herein for the sake of simplicity.

Implementations further provide a computer program.

The computer program is applicable to the network device of implementations. The computer program, when executed by a computer, is operable with the computer to implement the operations performed by the network device described in the foregoing method implementations, which will not be repeated herein for the sake of simplicity.

Alternatively, the computer program is applicable to the mobile terminal/the terminal device. The computer program, when executed by a computer, is operable with the computer to implement the operations performed by the mobile terminal/the terminal device described in the foregoing method implementations, which will not be repeated herein for the sake of simplicity.

Those of ordinary skill in the art will appreciate that units and algorithmic operations of various examples described in connection with implementations herein can be implemented by electronic hardware or by a combination of computer software and electronic hardware. Whether these functions are performed by means of hardware or software depends on the application and the design constraints of the associated technical solution. Those skilled in the art may use different methods with regard to each particular application to implement the described functionality, but such methods should not be regarded as lying beyond the scope of the disclosure.

It will be evident to those skilled in the art that, for the sake of convenience and simplicity, in terms of the working processes of the foregoing systems, apparatuses, and units, reference can be made to the corresponding processes of the above method implementations, which will not be repeated herein.

It will be appreciated that the systems, apparatuses, and methods disclosed in implementations herein may also be implemented in various other manners. For example, the above apparatus implementations are merely illustrative, e.g., the division of units is only a division of logical functions, and there may exist other manners of division in practice, e.g., multiple units or assemblies may be combined or may be integrated into another system, or some features may be ignored or skipped. In other respects, the coupling or direct coupling or communication connection as illustrated or discussed may be an indirect coupling or communication connection through some interface, device or unit, and may be electrical, mechanical, or otherwise.

Separated units as illustrated may or may not be physically separated. Components or parts displayed as units may or may not be physical units, and may reside at one location or may be distributed to multiple networked units. Some or all of the units may be selectively adopted according to practical needs to achieve desired objectives of the disclosure.

Various functional units described in implementations herein may be integrated into one processing unit or may be present as a number of physically separated units, and two or more units may be integrated into one.

If the functional units are implemented as software functional units and sold or used as standalone products, they may be stored in a computer readable storage medium. Based on such an understanding, the essential technical solution, or the portion that contributes to the prior art, or part of the technical solution of the disclosure may be embodied as software products. The computer software products can be stored in a storage medium and may include multiple instructions that, when executed, can cause a computing device, e.g., a personal computer, a server, a network device, etc., to execute some or all operations of the methods described in various implementations. The above storage medium may include various kinds of media that can store program codes, such as a universal serial bus (USB) flash disk, a mobile hard drive, a ROM, a RAM, a magnetic disk, or an optical disk.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for uplink feedback information transmission, comprising:
    receiving, by a terminal device, multiplex indication information via higher layer signaling, wherein the multiplex indication information indicates whether or not multiplex transmission of a first automatic repeat request (HARQ) acknowledgement (ACK)/negative acknowledgement (NACK) information and a second HARQ ACK/NACK information is supported;
    receiving, by the terminal device, first downlink data and second downlink data, wherein a first HARQ ACK/NACK resource corresponding to the first HARQ ACK/NACK information of the first downlink data and a second HARQ ACK/NACK resource corresponding to the second HARQ ACK/NACK information of the second downlink data occupy a same time-domain resource; and
    transmitting, by the terminal device, at least one of the first HARQ ACK/NACK information and the second HARQ ACK/NACK information, comprising:
        determining, by the terminal device, to transmit the first HARQ ACK/NACK information and the second HARQ ACK/NACK information at a same time domain when the multiplex indication information indicates that the multiplex transmission of the first HARQ ACK/NACK information and the second HARQ ACK/NACK information is supported; and
        transmitting, by the terminal device, the first HARQ ACK/NACK information and the second HARQ ACK/NACK information on the same time-domain resource,
    wherein a control-resource set (CORESET) to which a first downlink control information (DCI) used for scheduling the first downlink data belongs is different from a CORESET to which a second DCI used for scheduling the second downlink data belongs or the CORESET to which the first DCI belongs has an index different from that of the CORESET to which the second DCI belongs.

2. The method of claim 1, wherein transmitting, by the terminal device, at least one of the first HARQ ACK/NACK information and the second HARQ ACK/NACK information comprises:
    transmitting, by the terminal device, at least one of the first HARQ ACK/NACK information and the second HARQ ACK/NACK information according to a reference information set, wherein the reference information set comprises at least one of:
        a priority of the first HARQ ACK/NACK information and a priority of the second HARQ ACK/NACK information;
        whether the first HARQ ACK/NACK resource is the same as the second HARQ ACK/NACK resource;
        spatial relation information of the first HARQ ACK/NACK resource and spatial relation information of the second HARQ ACK/NACK resource;
        a transmission configuration indicator (TCI) state of the first downlink data and a TCI state of the second downlink data;
        the number of panels used for transmitting the first HARQ ACK/NACK information and the second HARQ ACK/NACK information;
        discrete Fourier transform (DFT) transform precoding configuration; or
        whether the first downlink data and the second downlink data comprise the same transmission block.

3. The method of claim 2, wherein transmitting, by the terminal device, at least one of the first HARQ ACK/NACK information and the second HARQ ACK/NACK information according to the reference information set comprises:
    transmitting, by the terminal device, the first HARQ ACK/NACK information and the second HARQ ACK/NACK information simultaneously on a time-domain resource, when the terminal device determines, according to the reference information set, that a first preset condition is satisfied,
    wherein the first preset condition comprises at least one of:
        the multiplex indication information indicates that multiplex transmission of the first HARQ ACK/NACK information and the second HARQ ACK/NACK information is not supported;
        the first HARQ ACK/NACK resource is different from the second HARQ ACK/NACK resource;
        the spatial relation information of the first HARQ ACK/NACK resource and the spatial relation information of the second HARQ ACK/NACK resource indicate the same reference signal, or indicate reference signals which are in a quasi-co-located (QCL) relationship;
        the TCI state of the first downlink data and the TCI state of the second downlink data indicate the same reference signal, or indicate reference signals which are in a QCL relationship;
        the number of panels used for transmitting the first HARQ ACK/NACK information and the second HARQ ACK/NACK information is greater than 1;
        the DFT transform precoding configuration indicates disabling DFT transform precoding; or
        the first downlink data and the second downlink data comprise different transmission blocks.

4. The method of claim 2, wherein transmitting, by the terminal device, the first HARQ ACK/NACK information and the second HARQ ACK/NACK information on the same time-domain resource comprises:

performing, by the terminal device, multiplex transmission on the first HARQ ACK/NACK information and the second HARQ ACK/NACK information on the time-domain resource, when the terminal device determines, according to the reference information set, that a third preset condition is satisfied, wherein the third preset condition comprises at least one of:
the first HARQ ACK/NACK resource is the same as the second HARQ ACK/NACK resource; the spatial relation information of the first HARQ ACK/NACK resource and the spatial relation information of the second HARQ ACK/NACK resource indicate the same reference signal, or indicate reference signals that are in a QCL relationship;
the TCI state of the first downlink data and the TCI state of the second downlink data indicate the same reference signal, or indicate reference signals which are in a QCL relationship;
the number of panels used for transmitting the first HARQ ACK/NACK information and the second HARQ ACK/NACK information is 1;
the DFT transform precoding configuration indicates enabling DFT transform precoding; or
the first downlink data and the second downlink data carry different data-transmission blocks.

5. The method of claim 4, wherein performing, by the terminal device, the multiplex transmission on the first HARQ ACK/NACK information and the second HARQ ACK/NACK information on the time-domain resource comprises:

performing, by the terminal device, cascade or joint encoding on the first HARQ ACK/NACK information and the second HARQ ACK/NACK information, and transmitting the obtained information on a same HARQ ACK/NACK resource.

6. The method of claim 2, wherein the priority of the first HARQ ACK/NACK information and the priority of the second HARQ ACK/NACK information are determined according to an identifier (ID) or an index of the CORESET to which the first DCI belongs and an ID or an index of the CORESET to which the second DCI belongs.

7. The method of claim 1, wherein an HARQ ACK/NACK resource is one of a physical uplink control channel (PUCCH) resource and a physical uplink shared channel (PUSCH) resource in which HARQ ACK/NACK information is carried.

8. The method of claim 1, wherein the first downlink data and the second downlink data are transmitted from different TRP respectively.

9. A terminal device, comprising:
a transceiver;
a memory configured to store computer programs; and
a processor configured invoke the computer programs stored in the memory to cause the transceiver to:
receive multiplex indication information via higher layer signaling, wherein the multiplex indication information indicates whether or not multiplex transmission of a first automatic repeat request (HARQ) acknowledgement (ACK)/negative acknowledgement (NACK) information and a second HARQ ACK/NACK information is supported;
receive first downlink data and second downlink data, wherein a first HARQ ACK/NACK resource corresponding to the first HARQ ACK/NACK information of the first downlink data and a second HARQ ACK/NACK resource corresponding to the second HARQ ACK/NACK information of the second downlink data occupy a same time-domain resource; and
transmit at least one of the first HARQ ACK/NACK information and the second HARQ ACK/NACK information, comprising:
transmit the first HARQ ACK/NACK information and the second HARQ ACK/NACK information on the same time-domain resource when the multiplex indication information indicates that the multiplex transmission of the first HARQ ACK/NACK information and the second HARQ ACK/NACK information is supported,
wherein a control-resource set (CORESET) to which a first downlink control information (DCI) used for scheduling the first downlink data belongs is different from a CORESET to which a second DCI used for scheduling the second downlink data belongs or the CORESET to which the first DCI belongs has an index different from that of the CORESET to which the second DCI belongs.

10. The terminal device of claim 9, wherein the computer programs stored in the memory to cause the transceiver to transmit at least one of the first HARQ ACK/NACK information and the second HARQ ACK/NACK information are further configured to:
transmit at least one of the first HARQ ACK/NACK information and the second HARQ ACK/NACK information according to a reference information set, wherein the reference information set comprises at least one of:
a priority of the first HARQ ACK/NACK information and a priority of the second HARQ ACK/NACK information;
whether the first HARQ ACK/NACK resource is the same as the second HARQ ACK/NACK resource;
spatial relation information of the first HARQ ACK/NACK resource and spatial relation information of the second HARQ ACK/NACK resource;
a transmission configuration indicator (TCI) state of the first downlink data and a TCI state of the second downlink data;
the number of panels used for transmitting the first HARQ ACK/NACK information and the second HARQ ACK/NACK information;
discrete Fourier transform (DFT) transform precoding configuration; or
whether the first downlink data and the second downlink data comprise the same transmission block.

11. The terminal device of claim 10, wherein the computer programs further cause the transceiver to:
transmit the first HARQ ACK/NACK information and the second HARQ ACK/NACK information simultaneously on the time-domain resource, when the processor determines, according to the reference information set, that a first preset condition is satisfied,
wherein the first preset condition comprises at least one of:
the multiplex indication information indicates that multiplex transmission of the first HARQ ACK/NACK information and the second HARQ ACK/NACK information is not supported;

the first HARQ ACK/NACK resource is different from the second HARQ ACK/NACK resource;

the spatial relation information of the first HARQ ACK/NACK resource and the spatial relation information of the second HARQ ACK/NACK resource indicate the same reference signal, or indicate reference signals which are in a quasi-co-located (QCL) relationship;

the TCI state of the first downlink data and the TCI state of the second downlink data indicate the same reference signal, or indicate reference signals which are in a QCL relationship;

the number of panels used for transmitting the first HARQ ACK/NACK information and the second HARQ ACK/NACK information is greater than 1;

the DFT transform precoding configuration indicates disabling DFT transform precoding; or the first downlink data and the second downlink data comprise different transmission blocks.

12. The terminal device of claim 11, wherein the computer programs further cause the transceiver to perform at least one of:

transmitting the first HARQ ACK/NACK information on the first HARQ ACK/NACK resource and transmitting the second HARQ ACK/NACK information on the second HARQ ACK/NACK resource, when the first HARQ ACK/NACK resource is different from the second HARQ ACK/NACK resource; and transmitting the first HARQ ACK/NACK information and the second HARQ ACK/NACK information simultaneously on the time-domain resource via different panels, when the number of panels used for transmitting the first HARQ ACK/NACK information and the second HARQ ACK/NACK information is greater than 1.

13. The terminal device of claim 10, wherein the computer programs that cause the transceiver to transmit the first HARQ ACK/NACK information and the second HARQ ACK/NACK information on the same time-domain resource are further configured to:

perform multiplex transmission on the first HARQ ACK/NACK information and the second HARQ ACK/NACK information on the time-domain resource, when the processor determines, according to the reference information set, that a third preset condition is satisfied, wherein the third preset condition comprises at least one of:

the first HARQ ACK/NACK resource is the same as the second HARQ ACK/NACK resource;

the spatial relation information of the first HARQ ACK/NACK resource and the spatial relation information of the second HARQ ACK/NACK resource indicate the same reference signal, or indicate reference signals which are in a QCL relationship;

the TCI state of the first downlink data and the TCI state of the second downlink data indicate the same reference signal, or indicate reference signals which are in a QCL relationship;

the number of panels used for transmitting the first HARQ ACK/NACK information and the second HARQ ACK/NACK information is 1;

the DFT transform precoding configuration indicates enabling DFT transform precoding; or the first downlink data and the second downlink data carry different data-transmission blocks.

14. The terminal device of claim 13, wherein the transceiver is configured to:

perform cascade or joint encoding on the first HARQ ACK/NACK information and the second HARQ ACK/NACK information, and transmit the obtained information on a same HARQ ACK/NACK resource.

15. The terminal device of claim 10, wherein the priority of the first HARQ ACK/NACK information and the priority of the second HARQ ACK/NACK information are determined according to an identifier (ID) or an index of the CORESET to which the first DCI belongs and an ID or an index of the CORESET to which the second DCI belongs.

16. The terminal device of claim 9, wherein an HARQ ACK/NACK resource is one of a physical uplink control channel (PUCCH) resource and a physical uplink shared channel (PUSCH) resource in which HARQ ACK/NACK information is carried.

17. The terminal device of claim 9, wherein the first downlink data and the second downlink data are transmitted from different TRP respectively.

18. A network device, comprising:

a memory configured to store computer programs; and a processor configured invoke and execute the computer programs stored in the memory, to perform:

transmitting first downlink data to a terminal device, wherein the first downlink data corresponds to first ACK/NACK information;

determining according to a backhaul connection delay, whether multiplex transmission of the first ACK/NACK information and second ACK/NACK information is supported, wherein the second ACK/NACK information corresponds to second downlink data transmitted by a second network device, and the first ACK/NACK information and the second ACK/NACK information occupy the same time-domain resource; and transmitting multiplex indication information to the terminal device, wherein the multiplex indication information is used for the terminal device to determine whether multiplex transmission of the first ACK/NACK information and the second ACK/NACK information is supported.

* * * * *